(12) United States Patent  
Burns

(10) Patent No.: US 12,444,246 B2  
(45) Date of Patent: Oct. 14, 2025

(54) AUTONOMOUS TRANSPORT VEHICLE AND HEALTH ASSESSMENT METHOD THEREFOR

(71) Applicant: Symbotic LLC, Wilmington, MA (US)

(72) Inventor: Daniel J. Burns, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 83 days.

(21) Appl. No.: 18/496,285

(22) Filed: Oct. 27, 2023

(65) Prior Publication Data

US 2024/0144742 A1 May 2, 2024

Related U.S. Application Data

(60) Provisional application No. 63/381,443, filed on Oct. 28, 2022.

(51) Int. Cl.
*G07C 5/02* (2006.01)
*B66F 9/06* (2006.01)
*G05B 23/02* (2006.01)

(52) U.S. Cl.
CPC .............. *G07C 5/02* (2013.01); *B66F 9/063* (2013.01); *G05B 23/0283* (2013.01)

(58) Field of Classification Search
CPC ........ G07C 5/02; G05B 23/0283; B66F 9/063
See application file for complete search history.

(56) References Cited

U.S. PATENT DOCUMENTS

| 2012/0189416 | A1 | 7/2012 | Toebes et al. |
| 2013/0108177 | A1 | 5/2013 | Sukthankar et al. |
| 2015/0081089 | A1 | 3/2015 | Kapust et al. |
| 2016/0214808 | A1* | 7/2016 | Cyrulik .................. B65G 67/02 |
| 2019/0368879 | A1 | 12/2019 | Roumeliotis et al. |

OTHER PUBLICATIONS

International Search Report for WO ISR dated Mar. 5, 2024.

* cited by examiner

*Primary Examiner* — Rodney A Butler
(74) *Attorney, Agent, or Firm* — Perman & Green, LLP

(57) ABSTRACT

An autonomous transport vehicle for transporting a payload comprising, a frame forming a transport payload area of the autonomous transport vehicle, the payload area includes a payload contact support surface that defines a payload support plane of the autonomous transport vehicle that supports the payload held in the transport payload area with vehicle traverse, a payload handling system connected to the frame, the payload handling system having, a payload transport disposed to engage the payload and transport the payload in at least one direction relative to the frame, and a drive section with at least one degree of freedom driving the payload transport in the at least one direction; and a controller operably connected to the drive section configured to register predetermined operating data embodying at least one dynamic performance variable output by the drive section effecting a predetermined motion, that defines a predetermined common motion manifold, of the payload.

20 Claims, 24 Drawing Sheets

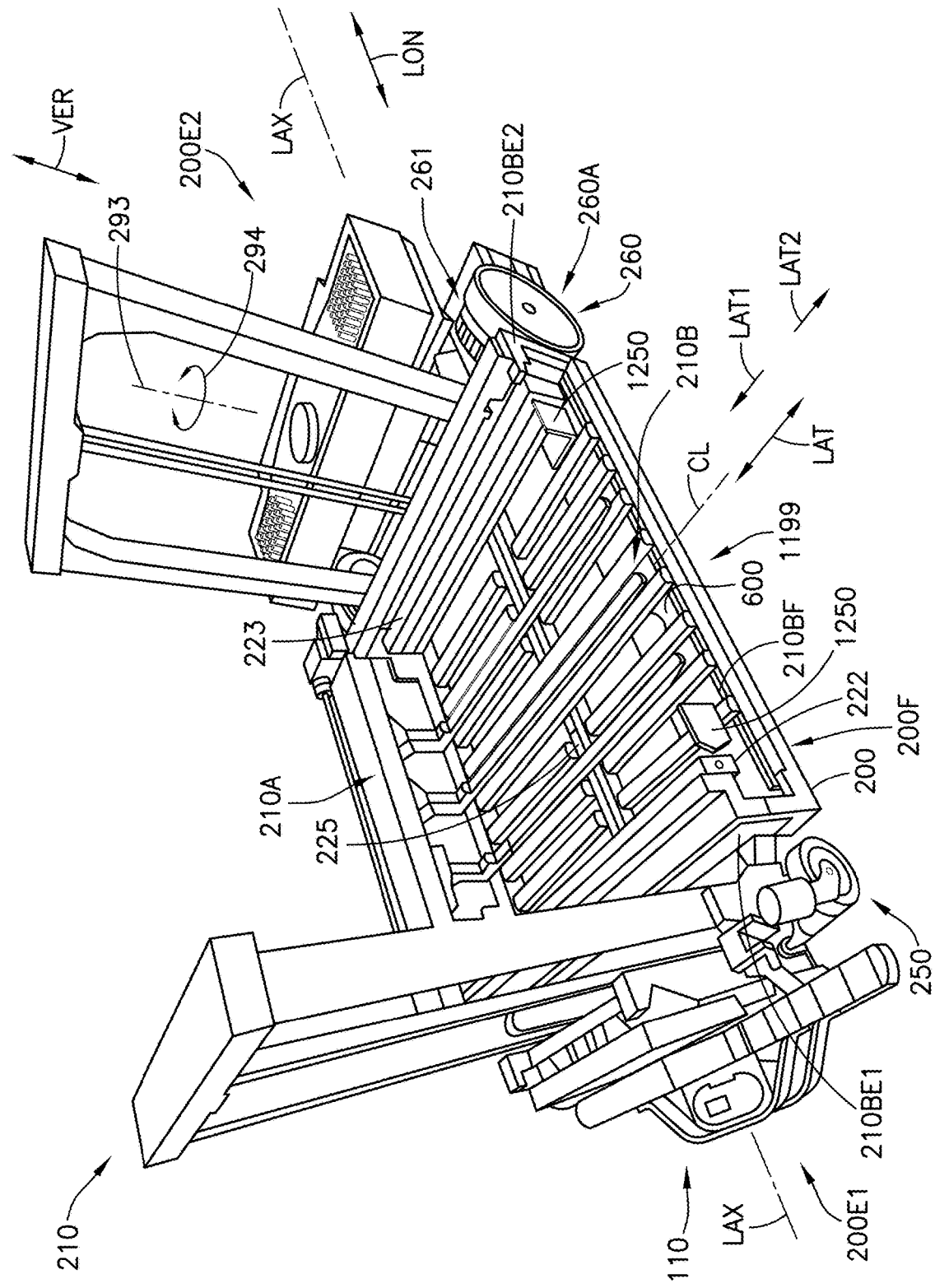

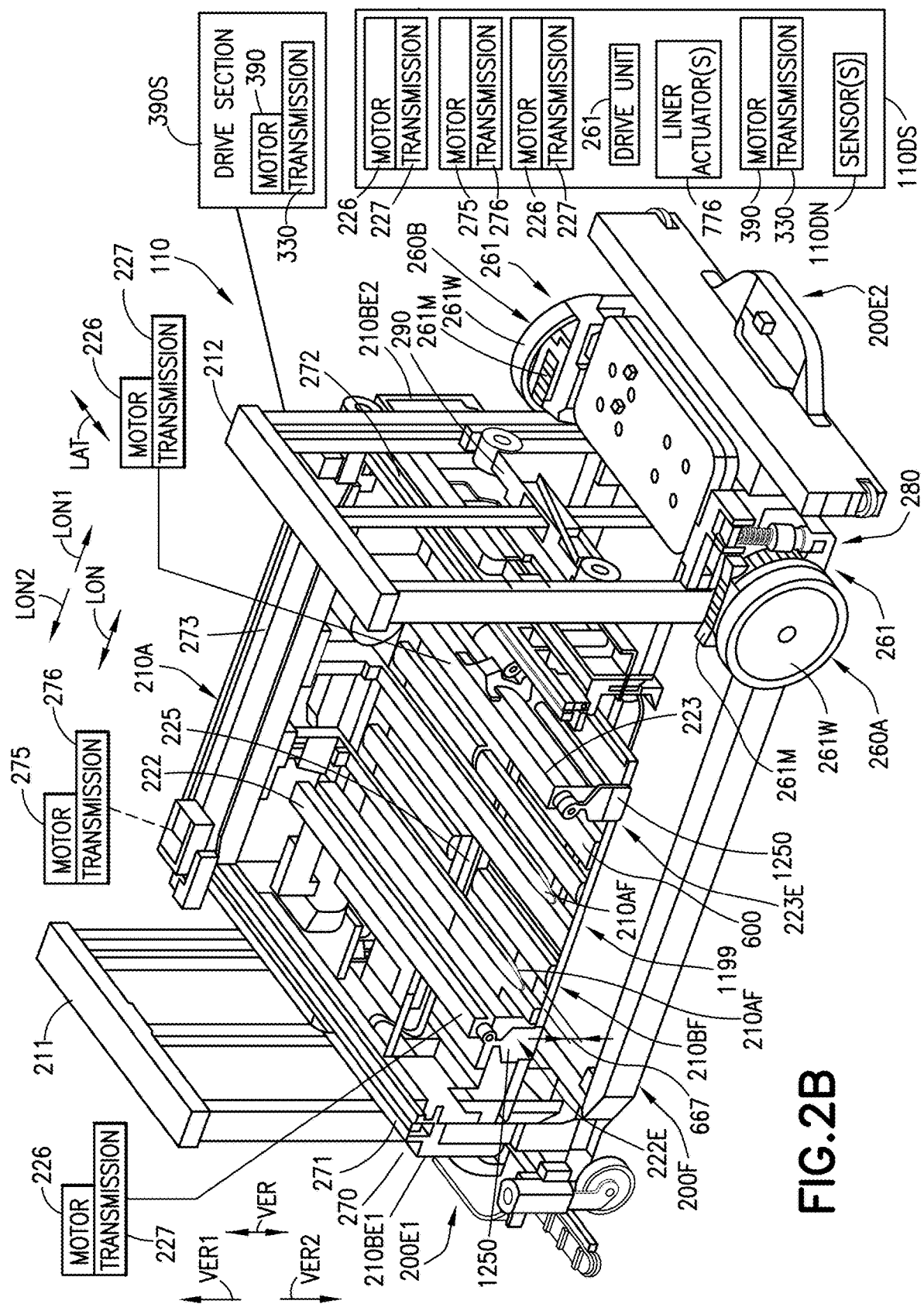

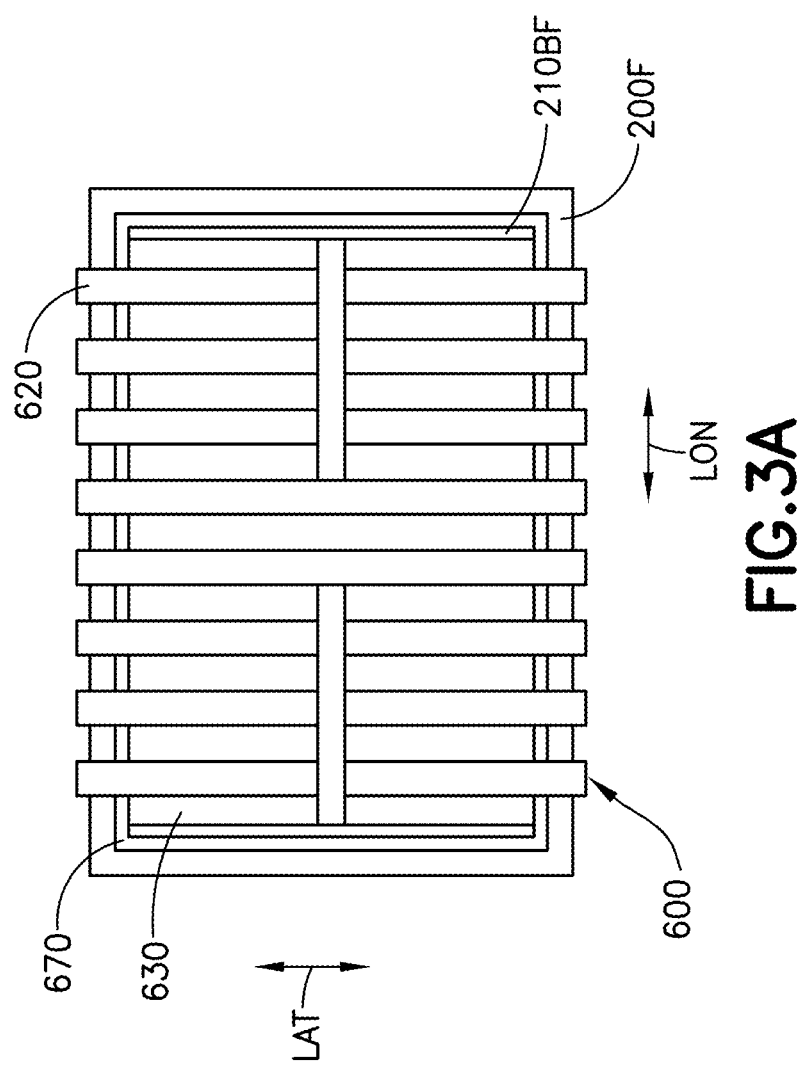

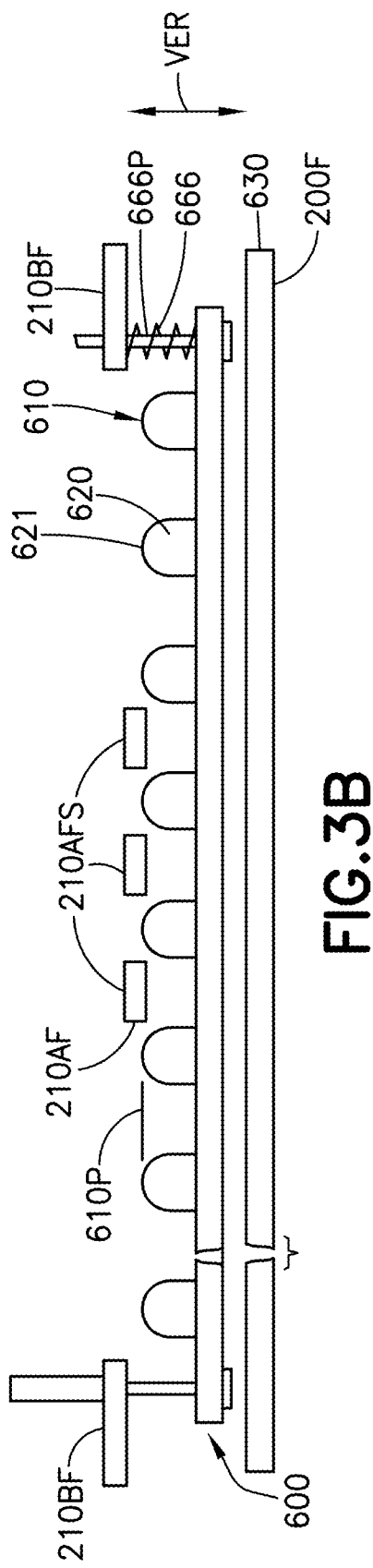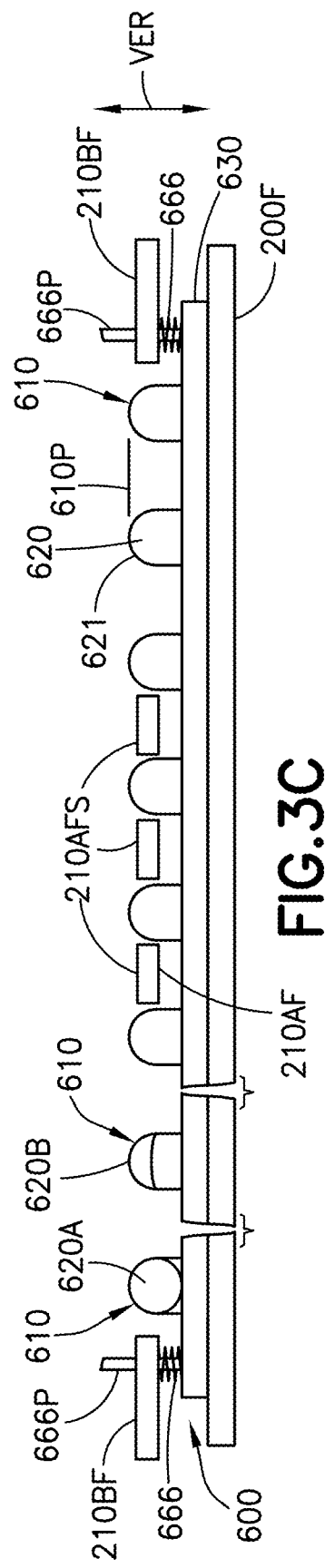

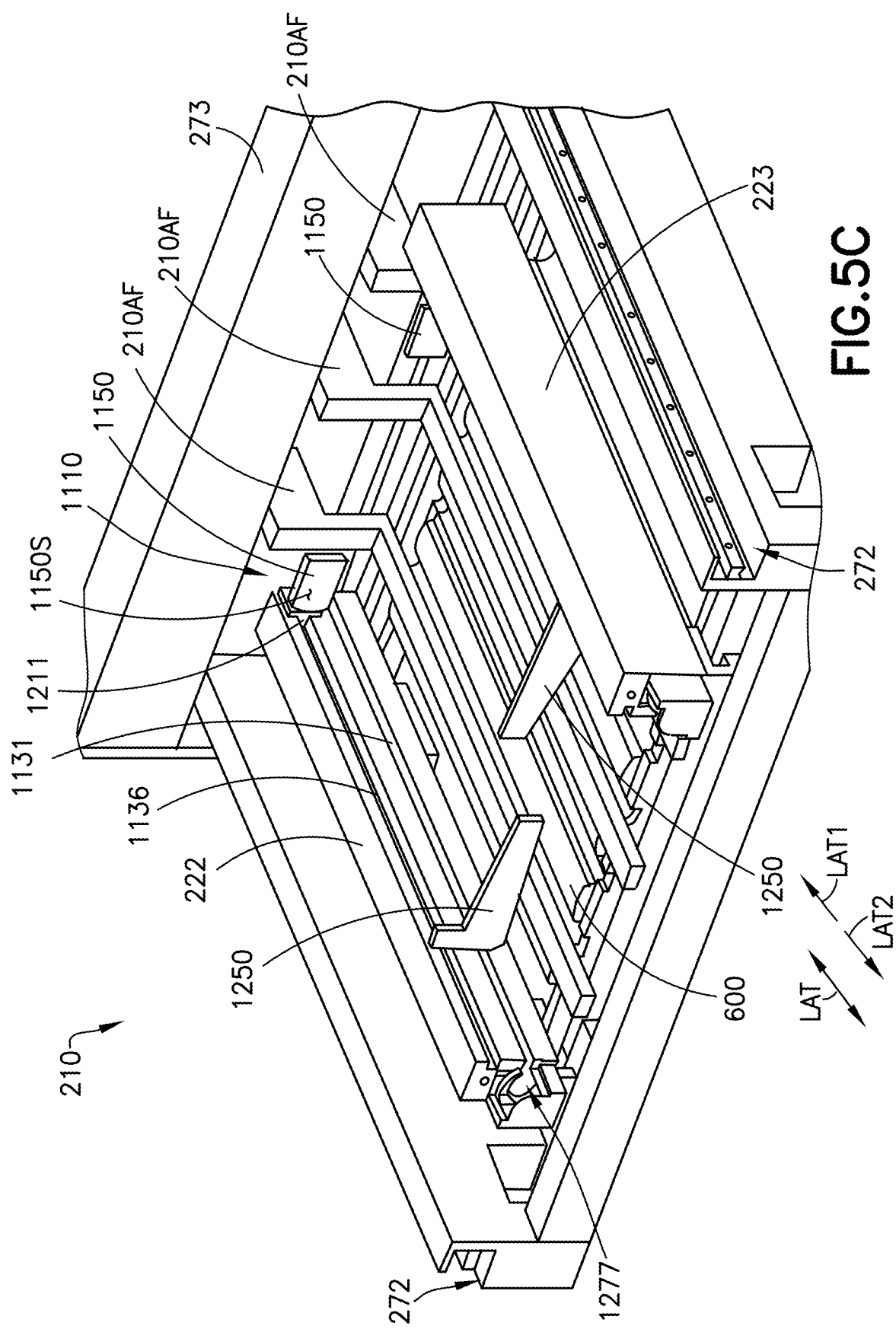

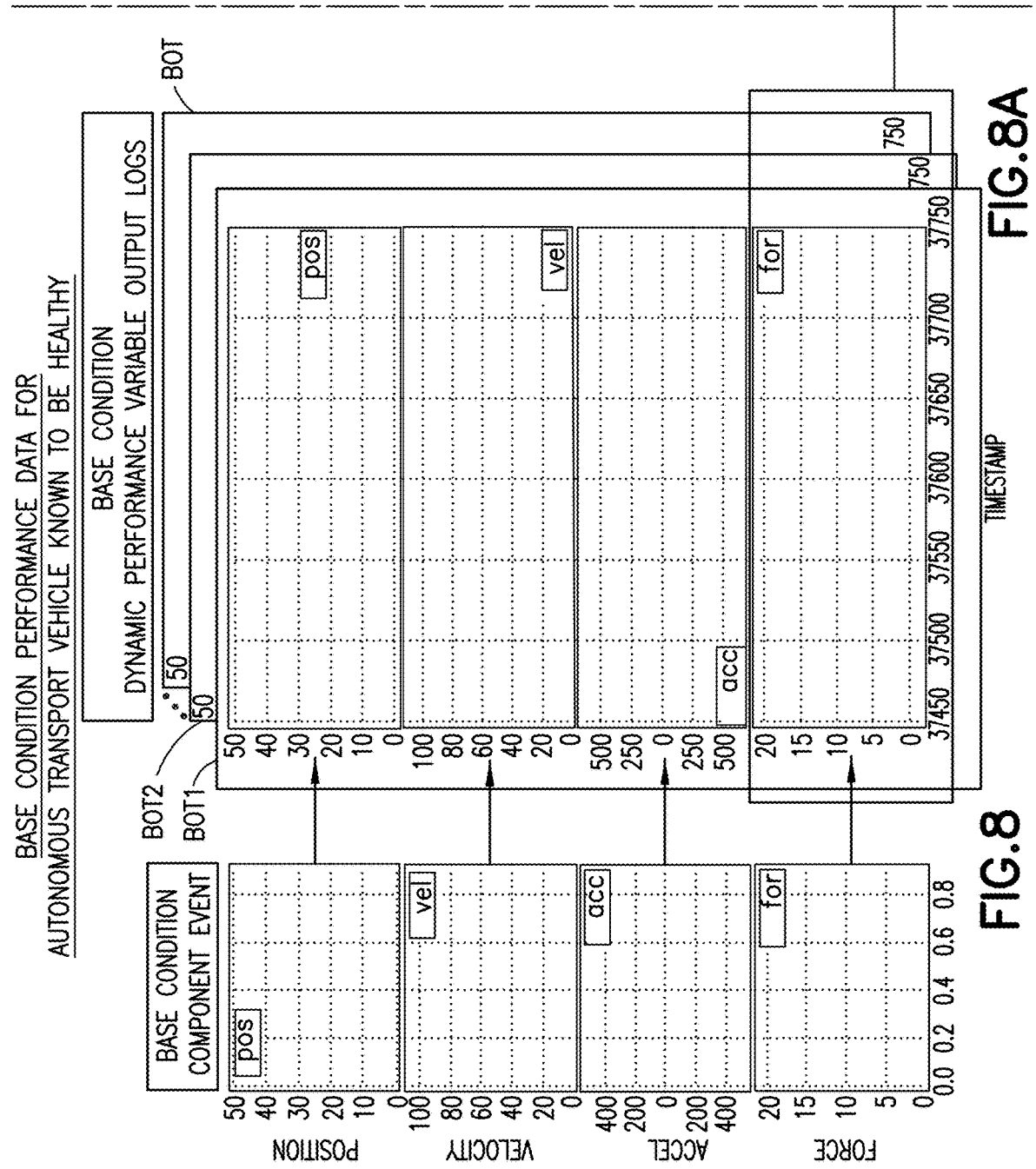

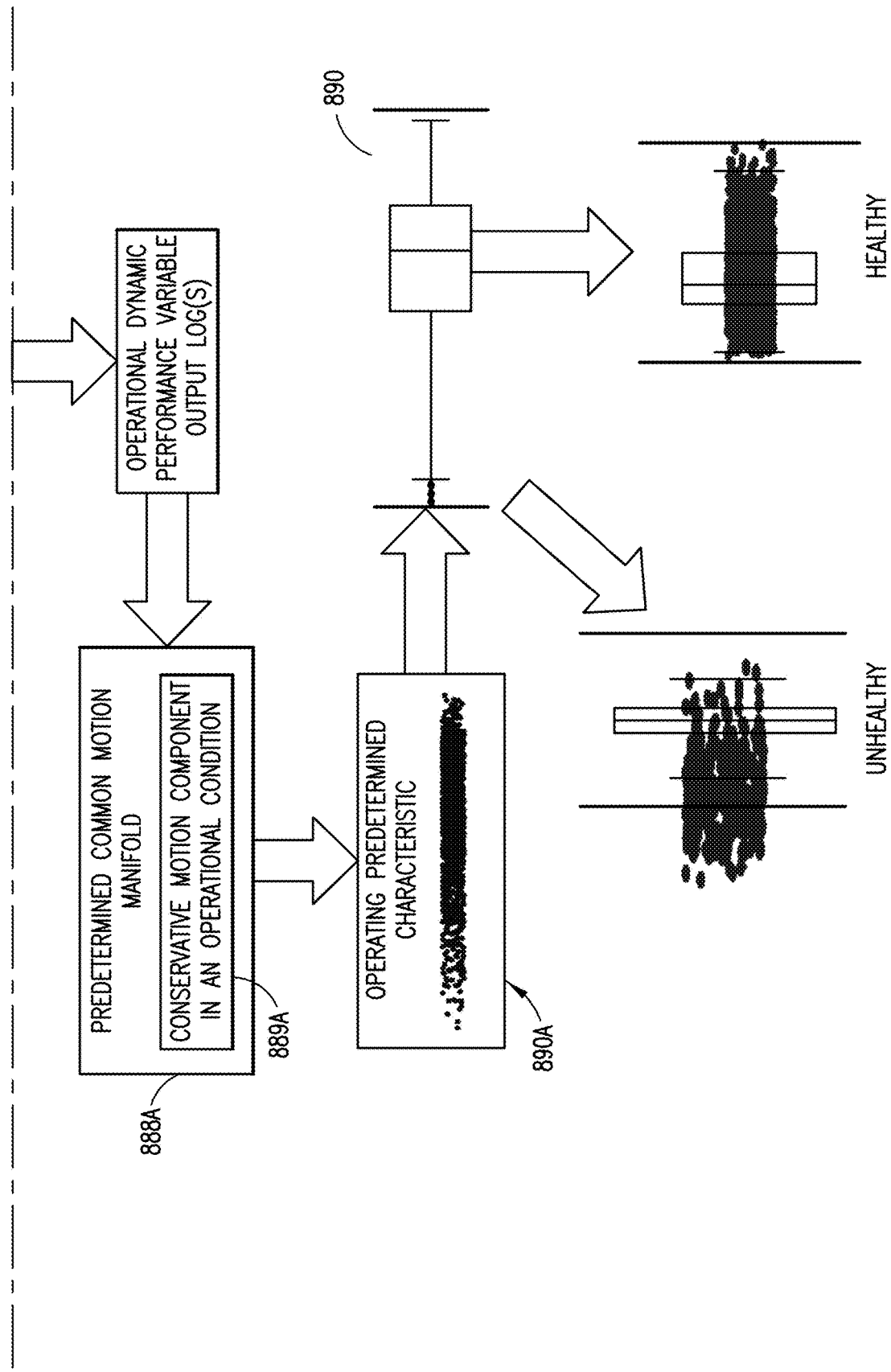

AUTONOMOUS TRANSPORT VEHICLE AND HEALTH ASSESSMENT METHOD THEREFOR

CROSS-REFERENCE TO RELATED APPLICATIONS

This application is a non-provisional of and claims the benefit of United States provisional patent application No. 63/381,443, filed on Oct. 28, 2022, the disclosures of which are incorporated herein by reference in their entireties.

BACKGROUND

1. Field

The disclosed embodiment generally relates to material handling systems, and more particularly, to transports for automated storage and retrieval systems.

2. Brief Description of Related Developments

Unscheduled downtime due to failures of components in mechatronic devices, such as in storage and retrieval systems, is a common problem which often represents a significant cost burden to the end user of the mechatronic devices.

A number of health assessment methods have been developed for industrial, automotive and aerospace applications. The existing systems typically implement fault detection to indicate that something is wrong in the monitored system, fault isolation to determine the exact location of the fault, i.e., the component which is faulty, and fault identification to determine the magnitude of the fault. The isolation and identification tasks together are often referred to as fault diagnosis. Many existing systems implement only the fault detection and isolation stages.

Such fault diagnosis schemes, though helpful in the detection of faults, isolation thereof and adaptive recovery, nonetheless leave the device, tool, or other automated equipment to operate in a substantially responsive manner with a limited or substantially non-existent prediction horizon. Predictive methods are known that seek to increase the prediction horizon to fault diagnostic systems, such as mathematic modelling of the automated equipment, in which sensory measurements of the mechatronic device variables are compared to analytically computed values of the respective variables (generated, e.g., from Newtonian dynamic models of the automated equipment, or neural network dynamic models in a measurement space that is generally created without regard to the specific knowledge or operation of the mechatronic devices (e.g., whether the mechatronic device is manipulating objects, under varying load, etc.), where the mathematic models represent nominal conditions. Generally the sensory measurements used for generating the dynamic models include large amounts of labeled data originating from the mechatronic device operating in a known (i.e., healthy) state.

It would be advantageous to have a health assessment and fault diagnosis schemes that are independent of object manipulation or loading on the mechatronic device caused by an object manipulated by a mechatronic device. It would also be advantageous to reduce the amount of data for determining bounds of normal mechatronic device operation with respect to fault modelling.

BRIEF DESCRIPTION OF THE DRAWINGS

The foregoing aspects and other features of the disclosed embodiment are explained in the following description, taken in connection with the accompanying drawings, wherein:

FIGS. 2A, 2B, and 2C are schematic perspective illustrations of an autonomous transport vehicle of the automated storage and retrieval system of FIG. 1 incorporating aspects of the disclosed embodiment;

FIG. 3A is a schematic perspective illustration of a portion of the autonomous transport vehicle of FIGS. 2A-2C in accordance with aspects of the disclosed embodiment;

FIG. 3B is a plan view of a portion of the autonomous transport vehicle shown in FIG. 2A in accordance with aspects of the disclosed embodiment;

FIG. 3C is a plan view of a portion of the autonomous guided vehicle shown in FIGS. 3A and 3B in accordance with aspects of the disclosed embodiment;

FIGS. 5A, 5B, and 5C are schematic perspective illustrations of portions of the case handling assembly of FIGS. 4A and 4B in accordance with aspects of the disclosed embodiment;

DETAILED DESCRIPTION

Figure 1:
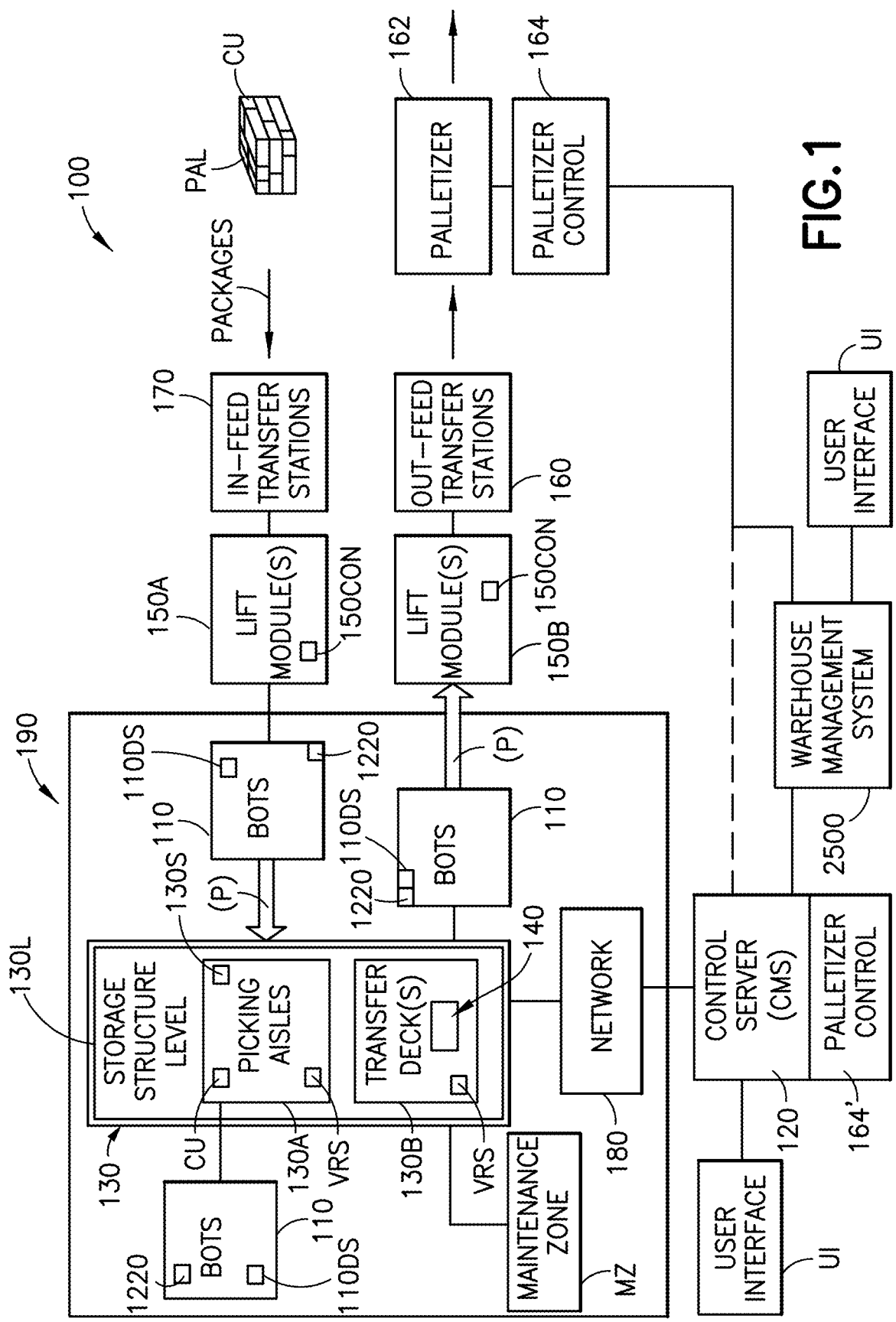
FIG. 1 is a block diagram of an exemplary automated storage and retrieval system incorporating aspects of the disclosed embodiment.

FIG. 1 illustrates an exemplary automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

As described in greater detail herein, the aspects of the disclosed embodiment provide for health assessment of components of the automated storage and retrieval system 100. For exemplary purposes only, the components of the automated storage and retrieval system are described herein with respect to autonomous transport vehicles 110 of the automated storage and retrieval system 100; however the components may be any suitable components of the storage and retrieval system described herein. The health assessment of, for example, the autonomous transport vehicles 110 is performed through anomaly detection in the autonomous transport vehicle components (e.g., drive sections, transfer arm, payload bed, justification bars, pushers/pullers, etc., described herein) with the autonomous transport vehicles 110 operating in the automated storage and retrieval system 100. As will be described herein, the autonomous transport vehicles 110 include one or more of prismatic and rotational mechanisms that are employed to manipulate objects (such as cases) in the automated storage and retrieval system 100. The prismatic and rotational mechanisms are driven by a controller 1220, of a respective autonomous transport vehicle 110, where the controller 1220 employs feedback control algorithms that compute at least motor currents of a motor employed to drive the prismatic and/or rotational mechanisms with a desired force, acceleration, and/or velocity. Feedback control signals (e.g., generated by or as a result of the feedback control algorithms) provide operational information about the component they control, where that operation information is employed by the controller 1220 (or other suitable controller, such as control server 120 and/or warehouse management system 2500, in communication with the autonomous transport vehicle 110) for health assessment diagnostics of the autonomous transport vehicle 110.

As may be realized, the prismatic and rotational mechanisms of the autonomous transport vehicles 110 are subject to wear as a result of their operation. The aspects of the disclosed embodiment may identify leading indicators of this wear (e.g., anomalies in the operation of the prismatic and rotational mechanisms) and an impending failure (e.g., remaining useful life) of the prismatic and rotational mechanisms. As noted above, in the aspects of the disclosed embodiment, feedback control signals are employed for health assessment diagnostics of the prismatic and rotational mechanisms. The feedback control algorithms are configured to substantially reject the machine component-to-machine component variations due to manufacturing differences in parts, and/or due to the aging and wearing characteristics of the machine component. By identifying properties of a feedback control signal controlling a healthy machine component, it can be determined when a health of the machine component declines based on a deviation from the identified properties.

It is noted that, the feedback control signals for any given predetermined motion (e.g., that may be repeated more than once) of the machine components of the autonomous transport vehicle 110 may include control portions in which the prismatic and/or rotational mechanisms is/are interfacing with an object (i.e., control portions that effect manipulation of an object having a known or unknown mass) and control portions in which the prismatic and rotational mechanisms is free of object interaction (i.e., control portions that effect a desired motion independent of object manipulation—which may be referred to as a conservative motion that is defined further herein). The aspects of the disclosed embodiment identify the conservative motions without being confounded by the object manipulation motions, where it is the conservative motion that is employed for autonomous transport vehicle 110 health assessment. In addition, as the aspects of the disclosed embodiment employ the conservative motions, without the object manipulation motions, operational anomalies may be determined with fewer data than conventional health assessment methods.

While the aspects of the disclosed embodiment are described with respect to autonomous transport vehicles 110 of the automated storage and retrieval system 100, it should be understood that the aspects of the disclosed embodiment may be applied to any component of the automated storage and retrieval system 100 for which a conservative motion component can be determined. Further, the aspects of the disclosed embodiments may be applied to any suitable mechatronic device having one or more axes of motion for which a conservative motion may be determined.

The automated storage and retrieval system 100 in which the autonomous transport vehicles 110 operate is illustrated in FIG. 1 and may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g. uncontained). It is noted that the case units CU (also referred to herein as mixed cases, cases, and shipping units) may include cases of items/unit (e.g. case of soup cans, boxes of cereal, etc.) or individual item/units that are adapted to be taken off of or placed on a pallet. In accordance with the exemplary embodiments, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. Case units may also include totes, boxes, and/or containers of one or more individual goods, unpacked/decommissioned (generally referred to as breakpack goods) from original packaging and placed into the tote, boxes, and/or containers (collectively referred to as totes) with one or more other individual goods of mixed or common types at an order fill station. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases or totes filling replenishment orders, the pallets may contain any suitable number and combination of different case units (e.g. each pallet may hold different types of case units—a pallet holds a combination of canned soup, cereal, beverage packs, cosmetics and household cleaners). The cases combined onto a single pallet may have different dimensions and/or different SKU's.

Figure 14:
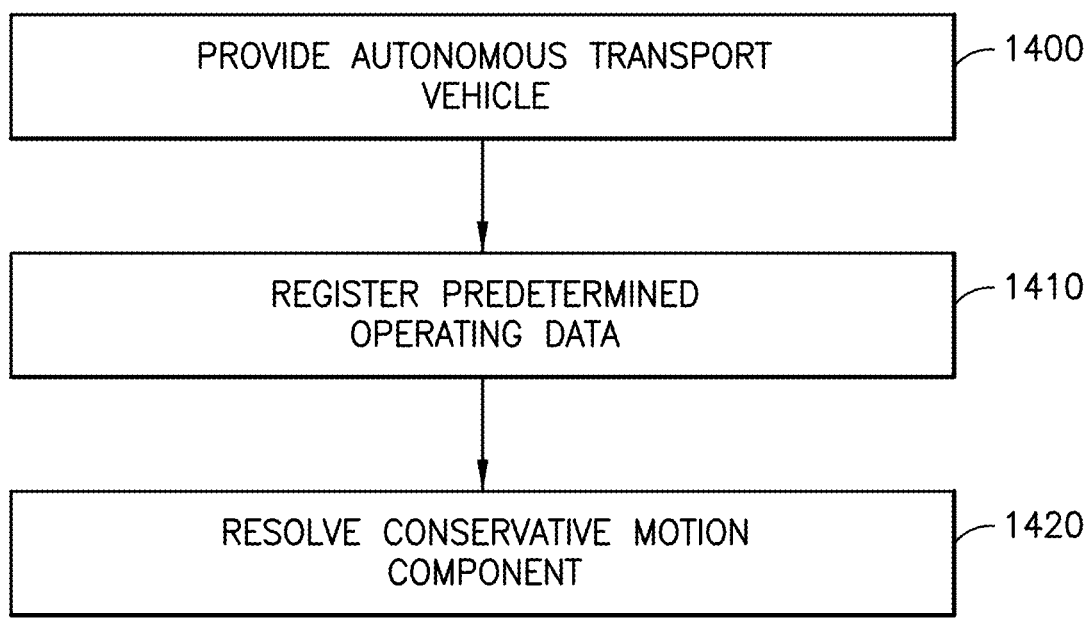
FIG. 14 is an exemplary flow diagram for an exemplary method in accordance with aspects of the disclosed embodiment.

The automated storage and retrieval system 100 may be generally described as a storage and retrieval engine 190 coupled to a palletizer 162. In greater detail now, and with reference still to FIG. 1, the storage and retrieval system 100 may be configured for installation in, for example, existing warehouse structures or adapted to new warehouse structures. As noted before the system 100 shown in FIG. 1 is representative and may include for example, in-feed and out-feed conveyors terminating on respective transfer stations 170, 160, lift module(s) 150A, 150B, a storage structure 130, and a number of autonomous transport vehicles 110 (also referred to herein as "bots"). It is noted that the storage and retrieval engine 190 is formed at least by the storage structure 130 and the autonomous transport vehicles 110 (and in some aspect the lift modules 150A, 150B; however in other aspects the lift modules 150A, 150B may form vertical sequencers in addition to the storage and retrieval engine 190 as described in U.S. patent application Ser. No. 17/091,265 filed on Nov. 6, 2020 and titled "Pallet Building System with Flexible Sequencing," the disclosure of which is incorporated herein by reference in its entirety). In alternate aspects, the storage and retrieval system may also include robot or autonomous transport vehicle transfer stations (not shown) that may provide an interface between the autonomous transport vehicles 110 and the lift module(s) 150A, 150B. The storage structure 130 may include multiple (stacked) levels 130L1-130Ln (see FIGS. 1 and 14, generally referred to as storage level 130 or a storage level 130, and where n is an integer that denotes an upper number of storage levels present in the storage and retrieval system 100) of storage rack modules where each level 130L includes respective picking aisles 130A, and transfer decks 130B for transferring case units between any of the storage areas of the storage structure 130 and a shelf of the lift module(s) 150A, 150B. The picking aisles 130A are in one aspect configured to provide guided travel of the autonomous transport vehicles 110 (such as along rails 1600—see FIG. 1) while in other aspects the picking aisles are configured to provide unrestrained travel of the autonomous transport vehicle 110 (e.g., the picking aisles are open and undeterministic with respect to autonomous transport vehicle 110 guidance/travel). The transfer decks 130B have open and undeterministic autonomous transport vehicle support travel or riding surfaces VRS along which the autonomous transport vehicles 110 travel under guidance and control provided by autonomous transport vehicle suitable steering (such as by differential torque applied by drive wheels 261W or by steerable wheels)). In one or more aspects, the transfer decks 130B have multiple lanes between which the autonomous transport vehicles 110 freely transition for accessing the picking aisles 130A and/or lift modules 150A, 150B. The picking aisles 130A, and transfer decks 130B also allow the autonomous transport vehicles 110 to place case units CU into picking stock and to retrieve ordered case units CU. In alternate aspects, each level 130L may also include respective autonomous transport vehicle transfer stations 140. The autonomous transport vehicles 110 may be configured to place case units, such as the above described retail merchandise, into picking stock in the one or more levels 130L of the storage structure 130 and then selectively retrieve ordered case units for shipping the ordered case units to, for example, a store or other suitable location.

The in-feed transfer stations 170 and out-feed transfer stations 160 may operate together with their respective lift module(s) 150A, 150B for bi-directionally transferring case units CU to and from one or more levels 130L of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units from the storage and retrieval system 100. It is noted that while the aspects of the disclosed embodiment are described with respect to a multilevel storage array, the aspects of the disclosed embodiment may be equally applied to a single level storage array that is disposed on a facility floor or elevated above the facility floor.

As may be realized, the storage and retrieval system 100 may include multiple in-feed and out-feed lift modules 150A, 150B that are accessible by, for example, autonomous transport vehicles 110 of the storage and retrieval system 100 so that one or more case unit(s), uncontained (e.g. case unit(s) are not held in trays), or contained (within a tray or tote) can be transferred from a lift module 150A, 150B to each storage space 130S on a respective level 130L (see FIG. 1) and from each storage space 130S to any one of the lift modules 150A, 150B on a respective level 130L. The autonomous transport vehicles 110 may be configured to transfer the case units between the storage spaces 130S (e.g., located in the picking aisles 130A or other suitable storage space/case unit buffer disposed along the transfer deck 130B) and the lift modules 150A, 150B. Generally, the lift modules 150A, 150B include at least one movable payload support that may move the case unit(s) between the in-feed and out-feed transfer stations 160, 170 and the respective level 130L of the storage space 130S where the case unit(s) CU is stored and retrieved. The lift module(s) may have any suitable configuration, such as for example a reciprocating lift configuration, or any other suitable configuration. The lift module(s) 150A, 150B include any suitable controller (such as controller 120 or other suitable controller coupled to controller 120, warehouse management system 2500, and/or palletizer controller 164, 164') and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety).

The automated storage and retrieval system 100 may include a control system, comprising for example one or more control servers 120 that are communicably connected to the in-feed and out-feed conveyors and transfer stations 170, 160, the lift modules 150A, 150B, and the autonomous transport vehicles 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) 120 managing the case flow system. The network 180 may further include suitable communication for effecting a bi-directional interface with the autonomous transport vehicles 110. For example, the autonomous transport vehicles 110 may include an on-board processor/controller 1220. The network 180 may include a suitable bi-directional communication suite enabling the autonomous transport vehicle controller 1220 to request or receive commands from the control server 120 for effecting desired transport (e.g. placing into storage locations or retrieving from storage locations) of case units and to send desired autonomous transport vehicle 110 information and data including autonomous transport vehicle 110 ephemeris, status and other desired data, to the control server 120. As seen in FIG. 1, the control server 120 may be further connected to a warehouse management system 2500 for providing, for example, inventory management, and customer order fulfillment information to the CMS 120 level program. A suitable example of an automated storage and retrieval system arranged for holding and storing case units is described in U.S. Pat. No. 9,096,375, issued on Aug. 4, 2015 the disclosure of which is incorporated by reference herein in its entirety.

Figure 2C:
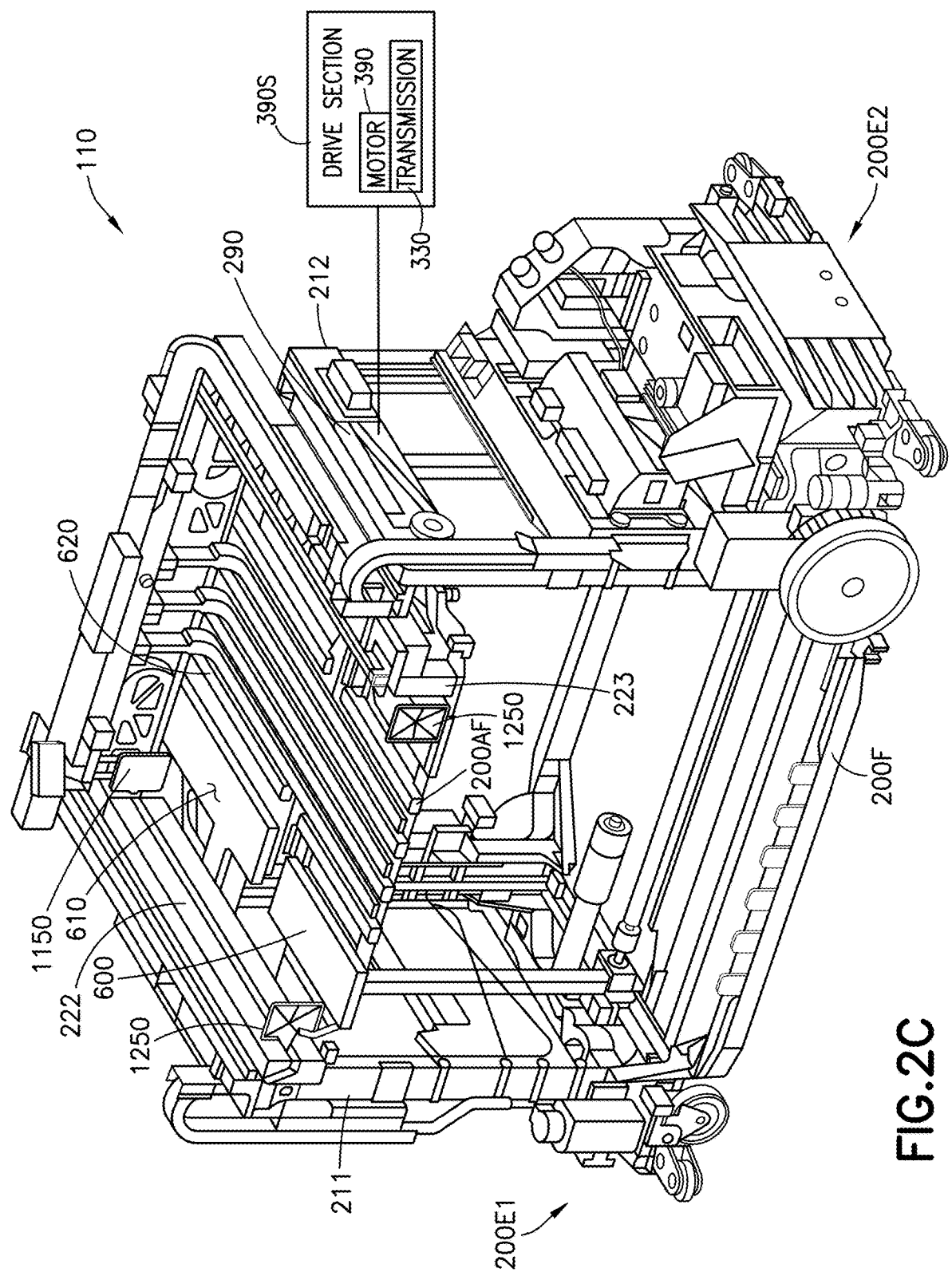
Figure 4A:
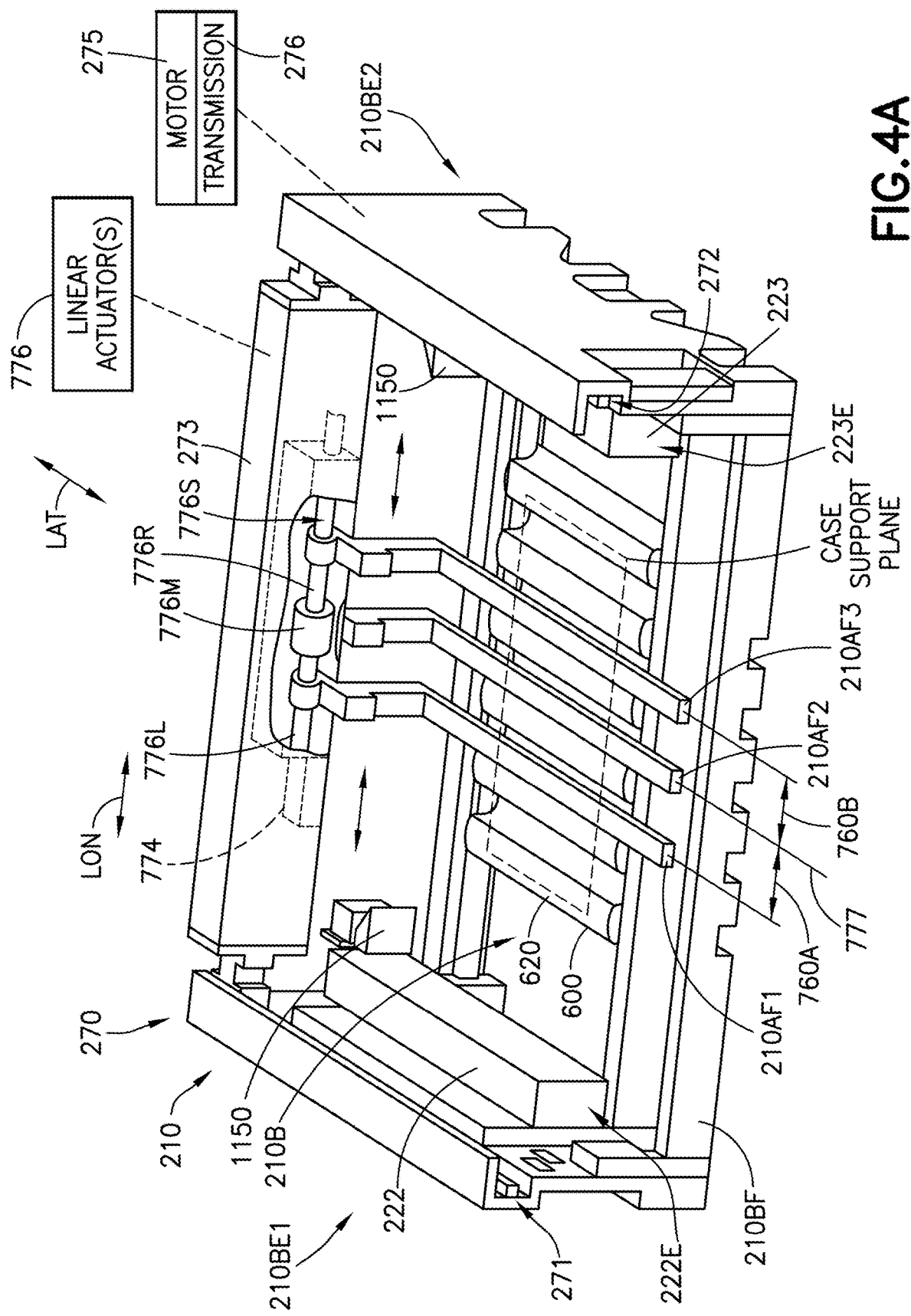
FIGS. 4A and 4B are schematic perspective illustrations of a portion of case handling assembly of the autonomous transport vehicle of FIGS. 2A-2C in accordance with aspects of the disclosed embodiment.
Figure 4B:
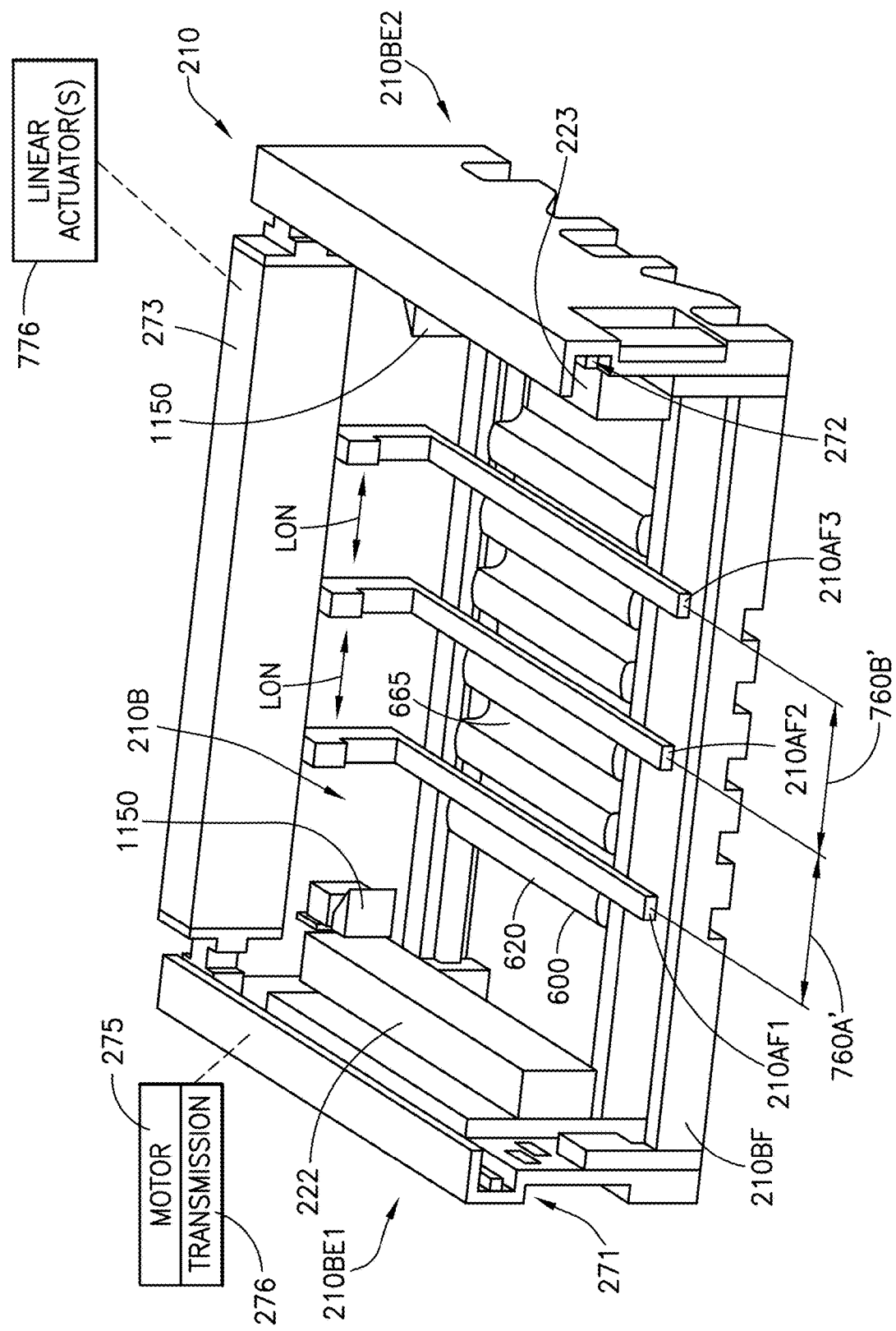

Referring now to FIGS. 2A, 2B, and 2C, the autonomous transport vehicle or bot 110 may have any suitable configuration, examples of which are described in U.S. patent application Ser. No. 17/664,944 filed on May 25, 2022 and titled "Autonomous Transport Vehicle"; U.S. patent application Ser. No. 17/664,948 filed on May 25, 2022 and titled "Autonomous Transport Vehicle with Synergistic Vehicle Dynamic Response"; U.S. patent application Ser. No. 17/664,838 filed on May 24, 2022 and titled "Autonomous Transport Vehicle with Steering"; United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which are incorporated herein by reference in their entireties.

The autonomous transport vehicle 110 includes a frame 200F having a front end 200E1 and a back end 200E2 that define a longitudinal axis LAX of the autonomous transport vehicle 110. The frame 200 includes a case handling assembly (also referred to as a payload handling system) 210 configured to handle cases/payloads transported by the autonomous transport vehicle 110. The frame 200F of the case handling assembly 210 forms a transport payload area (also referred to as a payload bed or area) 210B. As described herein the payload bed 210B includes any suitable payload contact support surface 610 (e.g., which for exemplary purposes is illustrated as being formed by protrusions 620 of justification tray 600) that defines a payload support plane 610P (see FIGS. 3B and 3C) of the vehicle 110 that supports the payload (e.g., case unit CU) held in the payload bay 210B with vehicle traverse.

The autonomous transport vehicle also includes any suitable transfer arm 210A (also referred to as a payload transport) that is driven by a drive section (see FIG. 2B) of the payload handling system 210, the drive section having at least one degree of freedom (see motors 226, 275, 390, 776) for driving the transfer arm 210A in at least one direction. The transfer arm 210A is configured to engage and pick a payload with respect to the payload support plane 610P (see FIGS. 3B and 3C), and extend and retract with respect to the payload bay 210B effecting payload transfer to and from the payload bay 210B unloading and loading the payload bay 210B. The transfer arm 210A is configured to transfer payloads between the autonomous transport vehicle 110 and a payload holding location (such as any suitable payload storage location, a shelf of lift module 150A, 150B, and/or any other suitable payload holding location). The transfer arm 210A may be configured to extend laterally in direction LAT and/or vertically in direction VER to transport payloads to and from the case handling assembly 210. In the aspect illustrated in FIGS. 2A and 2B the case handling assembly 210 includes at least one lift tower 211, 212 configured to move the transfer arm 210A and/or payload bed 210B vertically in the direction VER; however, in other aspects, the case handling assembly 210 may not have the at least one lift tower 211, 212. Examples of suitable payload beds 210B and transfer arms 210A and/or autonomous transport vehicles to which the aspects of the disclosed embodiment may be applied can be found in United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which are incorporated herein by reference in their entireties.

The frame 200 includes one or more suitable idler wheels 250 disposed adjacent the front end 200E1. The idler wheels 250 may be substantially similar to those described in U.S. patent application Ser. No. 17/664,948 filed on May 25, 2022 titled "Autonomous Transport Vehicle with Synergistic Vehicle Dynamic Response" and U.S. patent application Ser. No. 17/664,838 filed on May 24, 2022 titled "Autonomous Transport Vehicle with Steering," the disclosures of which are incorporated by reference herein in their entireties. The frame also includes one or more drive wheels 260 disposed adjacent the back end 200E2. The drive wheels 260 may be substantially similar to those described in U.S. patent application Ser. No. 17/664,948 filed on May 25, 2022, the disclosure of which was previously incorporated by reference herein in its entirety. In other aspects, the position of the idler wheels 250 and drive wheels 260 may be reversed (e.g., the drive wheels 260 are disposed at the front end 200E1 and the idler wheels 250 are disposed at the back end 200E2).

Each drive wheel 260 comprises a drive unit 261 that is independently coupled to the frame 200 in any suitable manner such as by suspension system 280, so that each drive wheel 260 is independently movable relative to the frame and any other drive wheel(s) 260 that is/are also coupled to the frame in a manner substantially similar to that described in U.S. patent application Ser. No. 17/664,948 filed on May 25, 2022, the disclosure of which was previously incorporated herein by reference in its entirety. It is noted that each drive unit 261 comprises any suitable drive motor 261M and a wheel 261W. The drive motor 261M is coupled to and rotationally drives the wheels 261W so as to propel the autonomous transport vehicle 110 in a travel direction. Here the motors 261M of two drive wheels 260A, 260B may be operated at the same time and at substantially the same rotational speed to propel the autonomous transport vehicle 110 in a substantially straight line path of travel. In other aspects, the motors 261M of the two drive wheels 260A, 260B may be operated at the same time (or at different times) and at different rotational speeds to propel the autonomous transport vehicle 110 along an arcuate path of travel or to pivot the autonomous transport vehicle in direction 294 about vehicle pivot axis 293. The vehicle pivot axis 293 may be located about midway between the two drive wheels 260A, 260B. The differential operation of the motors 261M of the respective drive wheels 260A, 260B that effects turning and/or pivoting of the autonomous guided vehicle 110 as described above is referred to herein as differential drive wheel steering.

Referring still to FIGS. 2A, 2B, and 2C the payload bed 210B is movably coupled to the at least one lift tower 211, 212 for vertical movement in direction VER and the transfer arm 210A is movably coupled to the payload bed 210B for lateral movement in direction LAT. The payload bed 210B includes a payload bed frame 210BF that forms the payload area in which case units carried by the autonomous transport vehicle 110 are disposed for transport throughout the storage and retrieval system 100. The payload bed frame 210BF includes longitudinal ends 210BE1, 210BE2 that are each coupled to a respective one of the at least one lift tower 211, 212. Here the at least one lift tower includes lift tower 211 disposed at or adjacent the front end 200E1 of the frame 200 and lift tower 212 disposed at or adjacent the back end 200E2 of the frame 200. Here, each lift tower 211, 212 includes a movable carriage or carrier 290 to which a respective one of the longitudinal ends 210BE1, 210BE2 is fixedly coupled in any suitable manner such as mechanical or chemical fasteners (i.e., so that as the movable carrier 290 moves the payload bed frame 210BF moves with the movable carrier 290).

A drive section 390S (which may be part of drive section 110DS with at least one degree of freedom movement) is coupled to the carrier 290 by any suitable transmission 330. Here, the flexible transmission movably couples the carrier 290 to the at least one lift tower 211, 212 and the drive section 290S is configured to move the carrier 290 relative to the at least one lift tower 211, 212. For example, the carrier 290 moves vertically in direction VER under motive force of any suitable drive motor 390 of the drive section 390S, where, for example, the drive motor 390 is coupled to the carrier 290 by the transmission 330. In one aspect, the drive motor 390 is a rotary motor coupled to the carrier 290 through a flexible transmission 330 (e.g., belts, chains, and/or cables); while in other aspect the drive motor 390 may be a linear motor (e.g., any suitable electric, hydraulic, and/or pneumatic linear actuator) coupled to the carrier 290 for moving the carrier 290 in direction VER.

Referring again to FIGS. 2A and 2B as well as FIGS. 3A, 3B, and 3C, as described above, the payload bed frame 210BF is coupled to (e.g., via the carriers 290) and extends between the lift towers 211, 212. In other aspects, the payload bed frame 210BF is cantilevered from one lift tower or coupled to more than two lift towers. The payload bed frame 210BF has mounted thereon a justification tray 600. The justification tray 600 includes a base 630 and at least one case unit support surface 610 coupled to the base 630 (or integrally formed with the base 630) in any suitable manner. The at least one case unit support surface 610 forms a case unit support plane 610P along which case units CU carried by the autonomous transport vehicle 110 can be moved laterally and/or longitudinally to justify/reposition the case units CU on the payload bed 210B as will be described herein. The at least one case unit support surface 610, in one or more aspects, is/are one or more protrusions 620 that extend from the base 630 where each protrusion 620 has an arcuate surface 621 upon which the case units are supported. In other aspects, the at least one case unit support surface 610 is/are one or more laterally extending rollers 620A that extend in direction LAT; while in still other aspects the at least one case unit support surface 610 is formed by a plurality of ball bearings 620B that form a ball transfer table; while in still other aspects the at least one case unit support surface 610 may be formed by a combination of protrusions, rollers, and ball bearings.

Referring to FIGS. 3A, 3B, and 3C, the base 630 of the justification tray 600 is coupled to the payload bed frame 210BF in any suitable manner, such as described in U.S. patent application Ser. No. 17/664,944 (previously incorporated herein by reference in its entirety), so that as the payload bed frame 210BF moves in direction VERT relative to the autonomous transport vehicle 110 frame 200F the justification tray 600 moves with the payload bed frame 210BF. For example, the payload bed frame 210BF includes guide members 666P (e.g., posts, rods, etc.) that hold the justification tray captive to the payload bed frame 210BF and along which the justification tray slides in direction VERT. In one or more aspects, any suitable biasing member(s) 666 (e.g., springs, resilient/rubber bushings, etc.) are provided and bias (in direction VERL) the justification tray 600 away from the payload bed frame 210BF; while in other aspects gravity and/or biasing members 666 may bias the justification tray 600 in direction VERL. With the justification tray 600 biased away from the payload bed frame 210BF (see FIG. 3B), case unit support surfaces 210AFS of tines or fingers 210AF of the transfer arm 210A (as will be described herein) are disposed above the payload support plane 610P of the justification tray 600. With the justification tray 600 moved toward the payload bed frame 210BF (e.g., against the biasing force of the biasing member(s) 666 and/or against the force of gravity—such as by contact of the justification tray 600 with the frame 200F) the case unit support surfaces 210AFS of tines or fingers 210AF of the transfer arm 210A are disposed below the payload support plane 610P (see FIG. 3C) so that case units CU are transferred from the case unit support surfaces 210AFS of the fingers 210AF to the support surface(s) 610 of the justification tray 600.

As illustrated in FIGS. 3A and 3C, at least a portion of the payload bed frame 210BF and at least a portion the base 630 of the justification tray 600 are shaped and sized to fit within and be recessed into the frame 200F of the autonomous transport vehicle 110. The justification tray 600 is configured so that the protrusions 620 (or in the case of the rollers 620A and ball bearings 620B any suitable tabs or portion of the base 630) extends over the frame 200F (in the aspect illustrated in FIG. 6A the protrusions extend laterally in direction LAT but in other aspects any suitable tabs may extend longitudinally in direction LON and/or laterally in direction LAT) so that as the portion of the payload bed frame 210BF is lowered/recessed (e.g., by the lift towers 211, 212) in direction VERL into an opening 670 of the frame 200F the protrusions 620 abut the frame 200F (or any other suitable hard stop surface of the autonomous transport vehicle 110) causing the justification tray 600 to be seated on the frame 200F (or any other suitable hard stop surface of the autonomous transport vehicle 110) and move toward the payload bed frame 210BF. As the payload bed frame 210BF continues to move in direction VERL (with the movement of the justification tray 600 in direction VERL stopped by the frame 200F) the payload support plane 610P is positioned above the case unit support surfaces 210AFS of tines or fingers 210AF to transfer case units CU from the fingers 210AF to the justification tray 600 (e.g., support of the case units are transferred from the transfer arm 210A to the justification tray 600 for justification/repositioning in directions LON, LAT). Any suitable resilient material (e.g., rubber (or other elastomeric/resilient material) bushings, pads, etc.) may be placed between the justification tray 600 and the frame 200F to substantially dampen vibrations from the frame 200F to the justification tray 600 and vice versa.

With the case units justified/repositioned, the lift towers 211, 212 move the payload bed 210B in direction VERU so that the biasing members 666 and/or gravity bias (e.g. in direction VERL) the justification tray 600 away from the payload bed frame 210BF. With continued movement of the payload bed 210B in direction VERU the case unit support surfaces 210AFS of the fingers 210AF move past (e.g., above) the payload support plane 610P of the justification tray 600 to transfer support of the case units CU from the justification tray 600 to the fingers 210AF. As may be realized, the case units CU can be transported by the autonomous transport vehicle 110 with the case units CU supported on the justification tray and/or supported on the fingers 210AF.

Referring to FIGS. 2A, 2B, 4A, and 4B, as described above, the transfer arm 210A is movably coupled to the payload bed frame 210BF in any suitable manner so that the fingers 210AF of the transfer arm 210A are spaced from the payload bed frame 210BF in direction VER by any suitable distance 667 (FIG. 2B). For example, the transfer arm 210A includes an extension axis 270 that is coupled to the payload bed frame 210BF and configured to provide movement of the fingers 210AF relative to the payload bed frame 210BF in direction LAT. Here the extension axis 270 includes a linear guide rail 271 coupled to the payload bed frame 210BF at or adjacent end 210BE1 of the payload bed frame 210BF, and another linear guide rail 272 coupled to the payload bed frame 210BF at or adjacent end 210BE2 of the payload bed frame 210BF. The fingers 210AF are coupled to a finger support rail 273 of the transfer arm 210A, where the finger support rail 273 spans between and is movably coupled to the linear guide rails 271, 272 for reciprocating movement (e.g., extension and retraction) along the linear guide rails 271, 272 in direction LAT. The transfer arm 210A includes any suitable motor 275 (e.g., rotary motor, linear motor, etc.) and transmission 276 (e.g., belts, gears, etc.) for driving the finger support rail 273 along the linear guide rails 271, 272 to effect reciprocal movement of the fingers 210AF in direction LAT. In the aspect illustrated in the figures the transfer arm 210A extends and retracts from one lateral side of the autonomous transport vehicle 110 frame 200F while in other aspects the transfer arm 210A is configured for bidirectional extension (e.g., extends and retracts from both lateral sides of the autonomous transport vehicle 110 frame 200F).

In the aspects illustrated in FIGS. 2A, 2B, 4A, and 4B there are three fingers 210AF1, 210AF2, 210AF3 (see FIGS. 4A and 4B) coupled to the finger support rail 273; however, in other aspects there are more than three or less than three fingers coupled to the finger support rail 273. Here, one or more of the fingers 210AF1, 210AF2, 210AF3 are movably coupled to the finger support rail 273 so as to be movable along the finger support rail 273 in the direction LON to at least change/vary a pitch or distance between the fingers 210AF1, 210AF2, 210AF3. In one or more aspects, one or more of what may be referred to as outboard fingers 210AF1, 210AF3 are movable relative to one or more of what may be referred to as inboard fingers 210AF2. For example, the finger 210AF2 is stationarily fixed at a predetermined location on the finger support rail (e.g., does not move relative to the finger support rail 273) such as at or along a laterally extending centerline 777 of the payload bed 210B or the finger 210AF2 may be driven in direction LON independently of one or more of the outboard fingers 210AF1, 210AF3.

At least the fingers 210AF1, 210AF3 are coupled to the finger support rail 273 so as to move relative to each other and the finger 210AF2 in direction LON; while in other aspects, each of the finders 210AF1, 210AF2, 210AF3 are coupled to the finger support rail 273 so as to move relative to each other. The finger support rail 273 includes any suitable number of linear actuators 776 for effecting the movement of the fingers 210AF1, 210AF3 or fingers 210AF1, 210AF2, 210AF3 in direction LON. The fingers 210AF1, 210AF2, 210AF3 may be movable in direction LON independent of each other, in a fixed relationship with one or more other fingers, or as a single unit. The linear actuator(s) is/are any suitable actuator(s), examples of which include but are not limited to, pneumatic cylinders, hydraulic cylinders, ball-screw drives, lead-screw drives, rack and pinion drives, rotary arm-linkage drives, belt drives, chain drives, or any other suitable drive configured to effect linear movement of the fingers along the finger support rail in direction LON.

In one or more aspects, each finger 210AF1, 210AF3 has a respective linear actuator 776 so that the fingers 210AF1, 210AF3 move independent of each other in direction LON, while in other aspects there is a single linear actuator 776 that is common to each finger 210AF1, 210AF3 so that the single actuator 776 moves each of the fingers 210AF1, 210AF3 in the direction LON in a fixed relationship. As an example, the linear actuator 776 is common to both fingers 210AF1, 210AF3 and includes a stepper motor 776M (or other suitable motor) and a lead screw 776S having a right handed lead screw portion 776R, and a left handed lead screw portion 776L, where the lead screw 776S is coupled to the stepper motor. One of the fingers 210AF1, 210AF3 is coupled to the right handed lead screw portion 776R and the other of the fingers 210AF1, AF3 is coupled to the left handed lead screw portion 776L so that as the stepper motor simultaneously rotates both the left and right handed lead screw portions 776L, 776R in a first rotation direction the fingers 210AF1, 210AF2 move away from each other and away from the finger 210AF2 to increase the distance 760A, 760B between the fingers to any suitable increased distance 760A', 760B'. As the stepper motor 776M simultaneously rotates both the left and right handed lead screw portions 776L, 776R in a second rotation direction (opposite the first rotation direction) the fingers 210AF1, 210AF2 move towards each other and towards the finger 210AF2 to decrease the distance 760A', 760B' between fingers to distance 760A, 760B. The distances 460A, 760B, 760A', 760B' correspond with a size of a case unit to be picked/transferred, a spacing between protrusions 620 of the justification tray 600 (FIGS. 7A and 7B), and/or a spacing between slats of case unit supports at a case unit holding location.

Referring to FIGS. 2A, 2B, 4A, and 4B, in one or more aspects the case handling assembly 210 includes case unit justification. Here at least one justification bar 222, 223 is movably coupled to the payload bed frame 210B in any suitable manner so that the at least one justification bar 222, 223 moves in direction LON to position case unit CU in a predetermined location within the payload bed 210B relative to the longitudinal axis LAX of the autonomous transport vehicle 110. In the example illustrated there are two justification bars 222, 223, both of which move in the direction LON so as to at least move towards and away from each other; however, in other aspects one of the justification bars 222, 223 is stationarily fixed in direction LON while the other justification bar 222, 223 moves in direction LON towards and away from the stationarily fixed justification bar 222, 223. As described herein, the justification bars 222, 223 may be independently driven. Independently driving each justification bar 222, 223 provides for justification of case units at any position within the payload bay 210B. The case unit CU can be positioned off center (e.g., relative to a centerline of the payload bed 210B in direction LAT). Positioning a case unit CU off center in the payload bay 210B provides for a continuous equal gap between cases units on a storage shelf, which improves storage density.

In one or more aspects, the justification bars 222, 223 are coupled to one or more linear guide rails 225 of the payload bed frame 210BF (Se FIG. 2B). The justification bars 222, 223 are coupled to any suitable drive motor(s) 226 and transmission(s) 227 which in one aspect is/are similar to the drive motor 275 and transmission 276 that drives the movable finger segments described herein. For example, in one or more aspects a single drive motor 226 drives movement of both the justification bars 222, 2223 where the drive motor 226 is a stepper motor or any other suitable motor coupled to a lead screw in a manner similar to that described above with respect to the finger segments. Here one end of the lead screw (e.g., transmission 227) has right hand threads and the other end of the lead screw has left hand threads. Each justification bar 222, 223 includes a nut that engages a respective one of the right hand threads and left hand threads of the lead screw so that as the drive motor 275 turns the lead screw in a first rotation direction the justification bars 222, 223 move towards each other (and towards a longitudinal centerline CL of the payload bed 210B) and as the drive motor 275 turns the lead screw in a second opposite rotation direction (i.e., opposite the first rotation direction) justification bars 222, 223 move away from each other (e.g., justification bar 222 moves towards end 200BE1 of the payload bed 210B and justification bar 223 moves towards end 200BE2 of the payload bed 210B). Here both justification bars 222, 223 are driven by the a single (i.e., the same) drive motor 226 and transmission 227 (the drive motor and transmission are common to both justification bars 222, 223); however, in other aspects, the autonomous transport vehicle 110 includes two drive motors 226 and at least one transmissions 227 (i.e., a transmission for each justification bar 222, 223 or a common (i.e., one) transmission for each justification bar 222, 223) so each justification bar 222, 223 is driven by a respective motor and transmission to move in direction LON independent of movement of the other justification bar 222, 223 (here justification of cases unit is not limited to a "center justification" relative to the centerline CL of the payload bed, instead the case units can be justified to any location between the ends 210BE1, 210BE2 of the payload bed 210B).

Figure 5A:
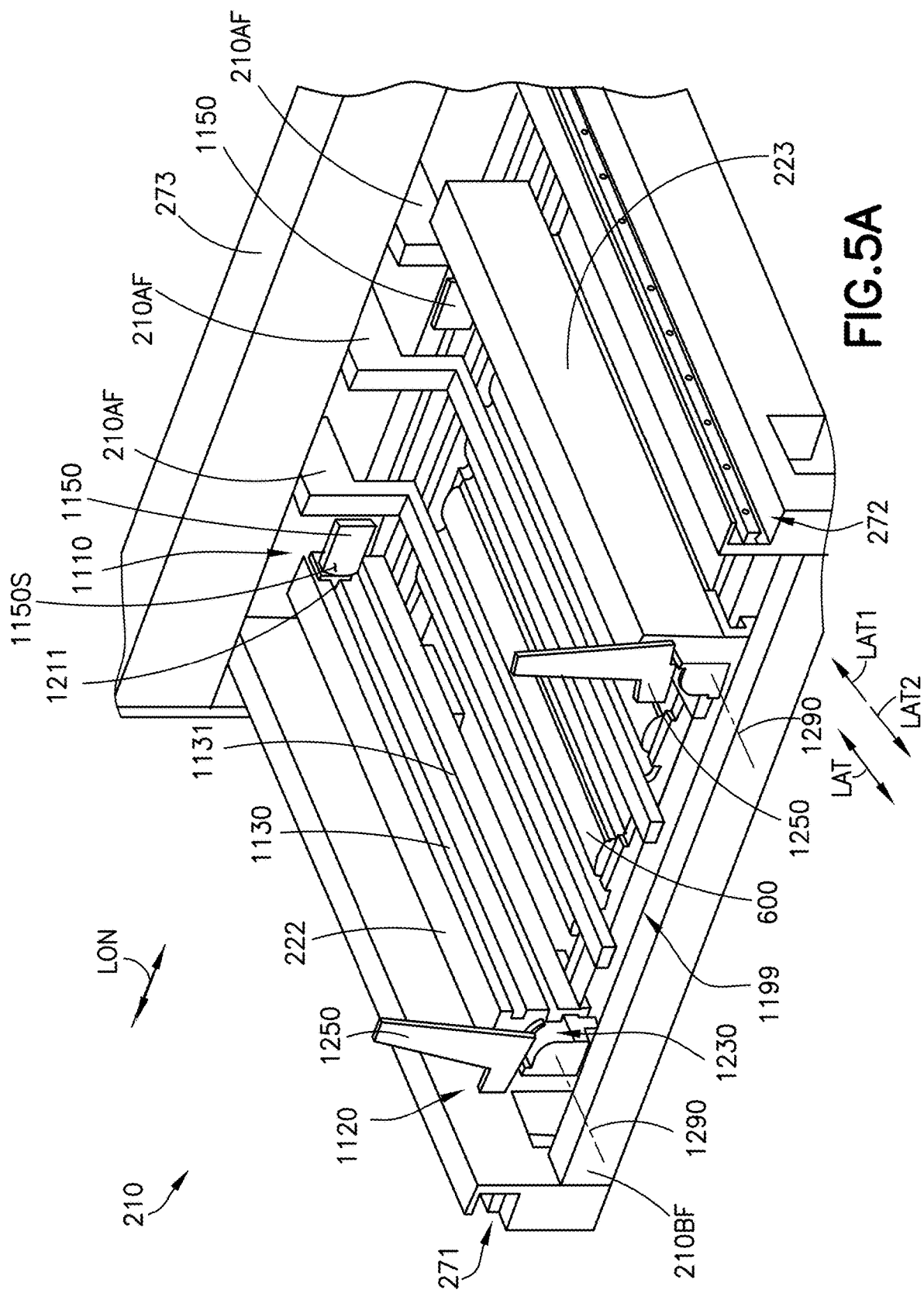
Figure 5B:
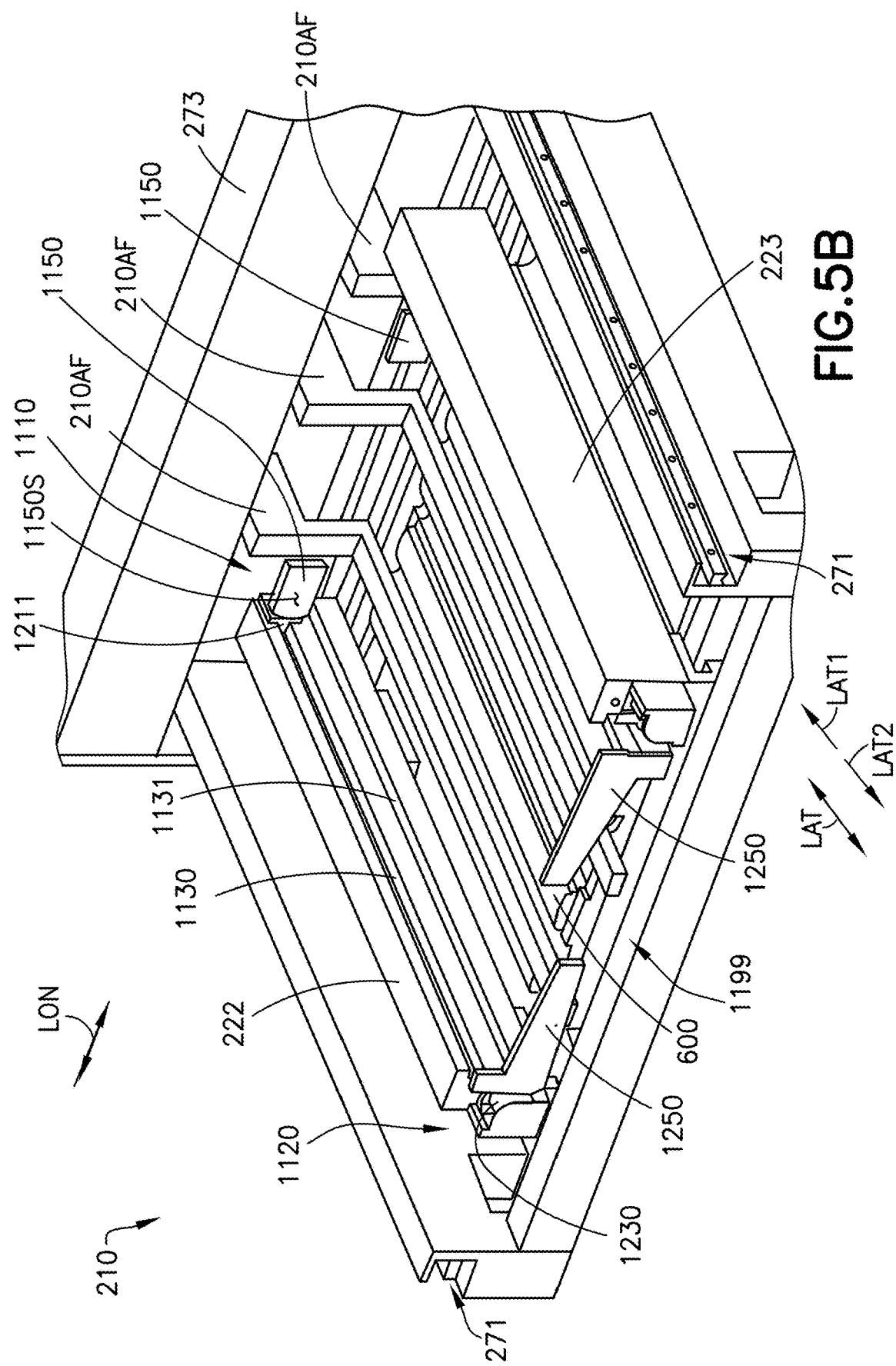
Figure 6A:
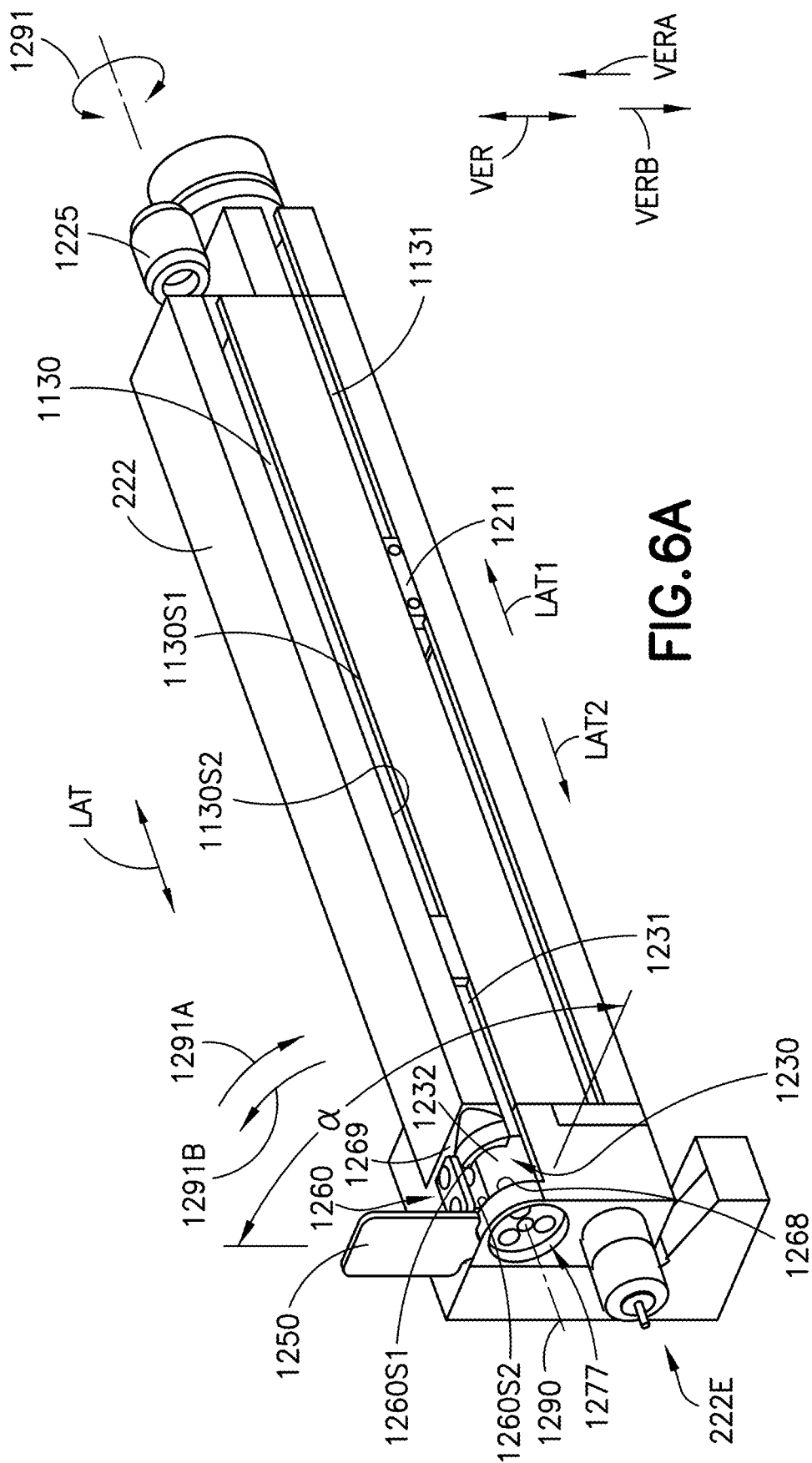
FIGS. 6A, 6B, and 6C are schematic perspective illustrations of portions of the case handling assembly of FIGS. 4A and 4B in accordance with aspects of the disclosed embodiment.
Figure 11A:
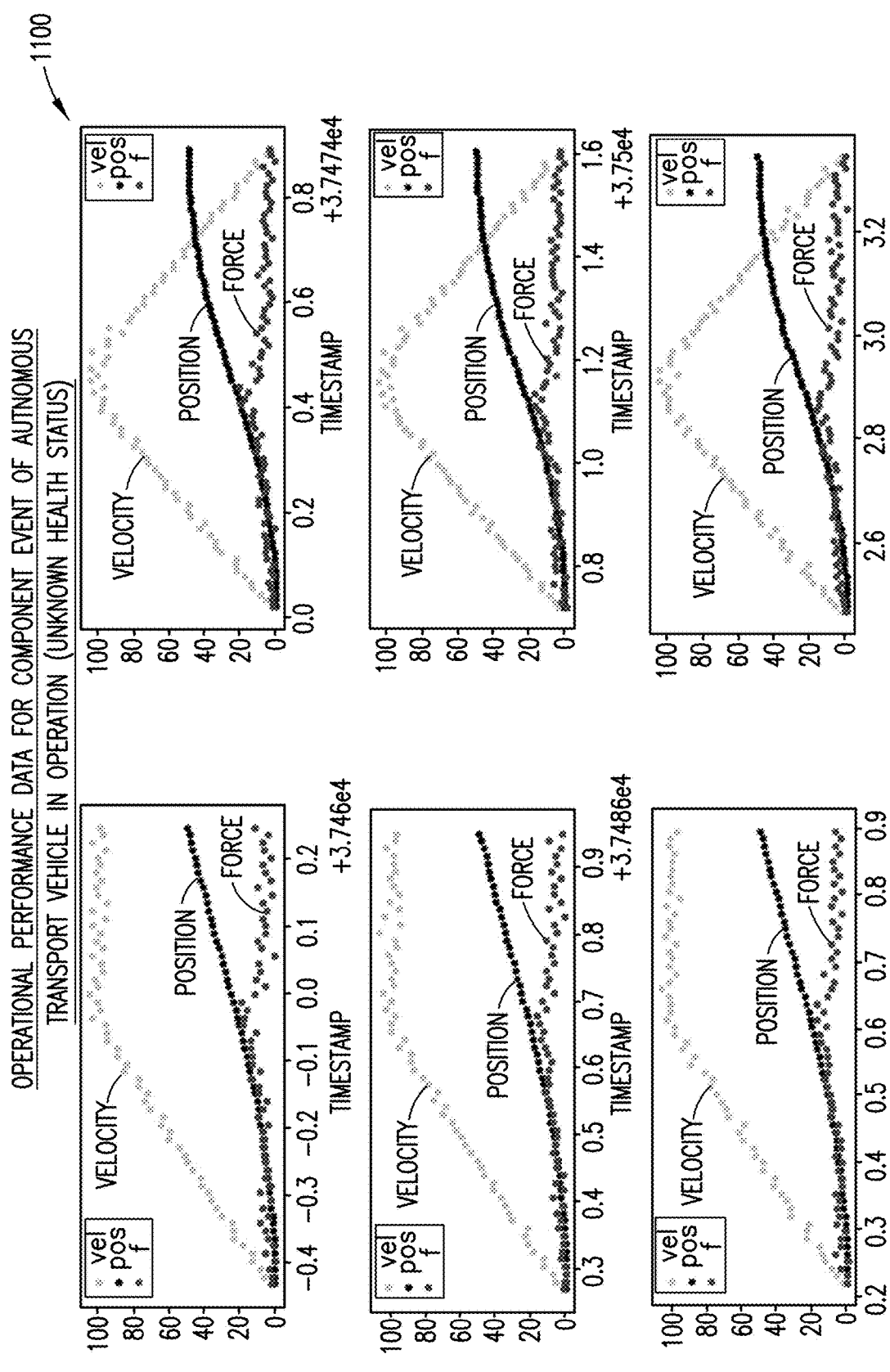
FIG. 11 is a schematic illustration of exemplary operational performance data for a predetermined motion of the autonomous transport vehicle of FIG. 1 in accordance with aspects of the disclosed embodiment.

Referring to FIGS. 5A-5C and 6A-6C each justification bar 222, 223 includes a case pusher assembly 1110 and a case puller assembly 1120. The case pusher assembly 1110 and case puller assembly 1120 will be described with respect to justification bar 222 noting that the case pusher assembly 1110 and case puller assembly 1120 of justification bar 223 are substantially similar. Here the justification bar 222 includes slots 1130, 1131 disposed one above the other and extending in direction LAT along the justification bar 222. In FIG. 11A the pusher assembly 1110 is associated with the slot 1130 and the puller assembly 1120 is associated with the slot 1131; however, in other aspects, such as illustrated in FIG. 6A, the pusher assembly 1110 is associated with the slot 1131 and the puller assembly 1120 is associated with the slot 1130. The case pusher assembly 1110 and the case puller assembly 1120 are, in one or more aspects, used in combination to grip case units transported by the autonomous transport vehicle 110. In one or more aspects, one or more of the case pusher assembly 1110 and the case puller assembly 1120 are employed for justification of case units CU in direction LAT where the case units are supported by the fingers 210AF and/or justification tray 600. The case puller assembly 1120 is employed for pulling case units CU into the payload bed 210B to substantially prevent case unit overhang (e.g., a portion of a case unit extends outside of the payload bed 210B through the transfer opening 1199 of the payload bed 210B.

The pusher assembly 1110 includes any suitable linear actuator 1210 (e.g., lead screw drive, belt drive, piston, etc. driven by any suitable actuator such as stepper motor, servo motor, pneumatics, hydraulics, etc.) (see FIGS. 6A, 6B), a slider 1211 (see FIGS. 6A, 6B) coupled to the linear actuator 1210, and a pusher arm or tab 1150 coupled to the slider 1211 through the slot 1131 (or 1130 depending on whether the pusher assembly is associated with slot 1131 or slot 1130). The linear actuator 1210 is configured to move the slider 1211 in direction LAT along the channel or slot 1131 in any suitable manner. The pusher arm 1150 is coupled to the slider 1211 with any suitable mechanical or chemical fasteners (or is integrally formed with the slider 1211) and is configured with a case interface surface 1150S that contacts a side of a case unit CU for pushing the case unit towards a transfer opening 1199 of the payload bed 210B through which case units CU pass for transfer to and from the payload bed 210B.

The puller assembly 1120 includes any suitable linear actuator 1225 (e.g., lead screw drive, belt drive, piston, etc. driven by any suitable actuator such as stepper motor, servo motor, pneumatics, hydraulics, etc.), a rotating slider assembly 1230 coupled to the linear actuator 1225, and a pusher arm or tab 1250 coupled to the rotating slider assembly

Figure 6B:
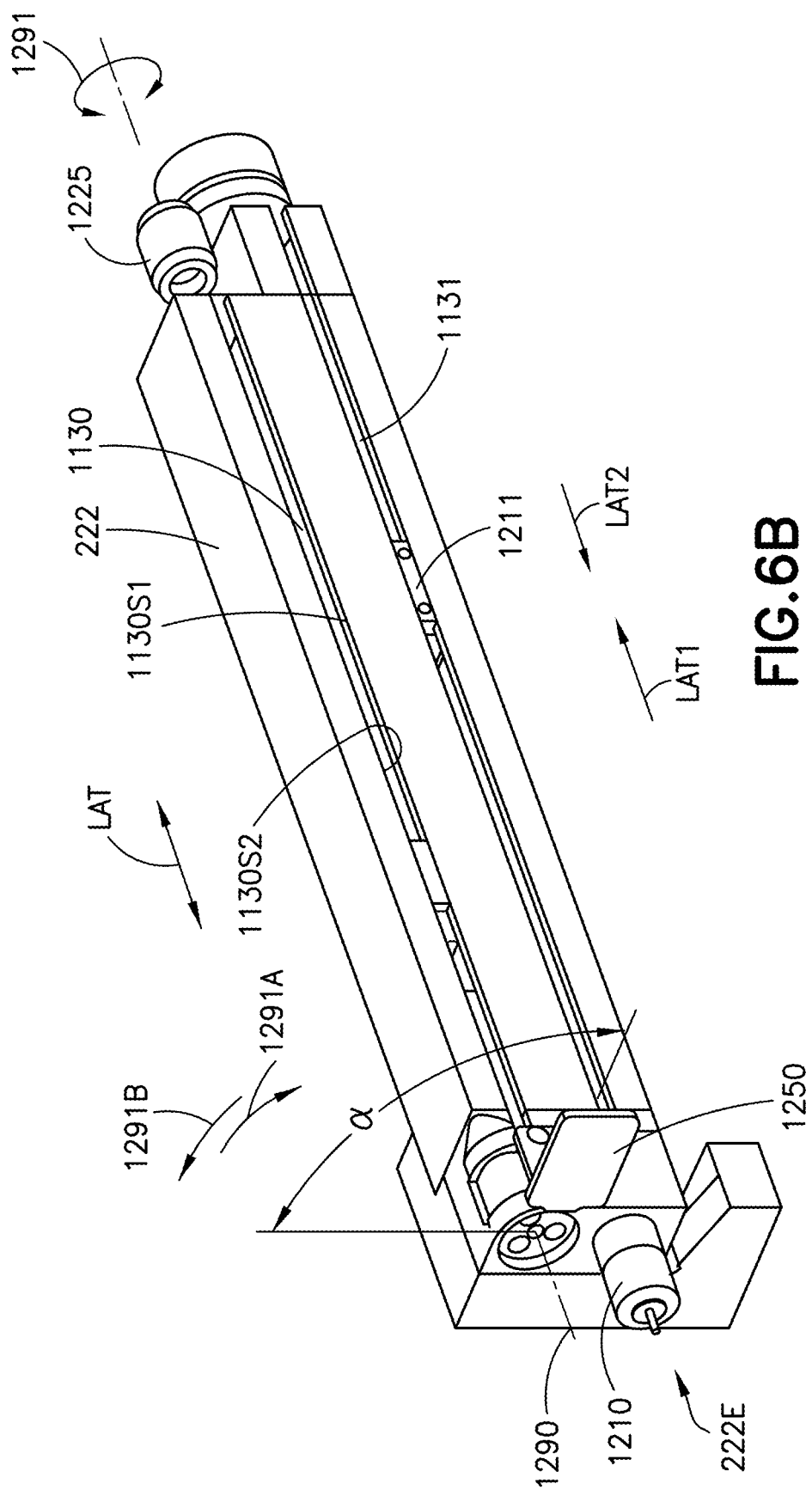
Figure 6C:
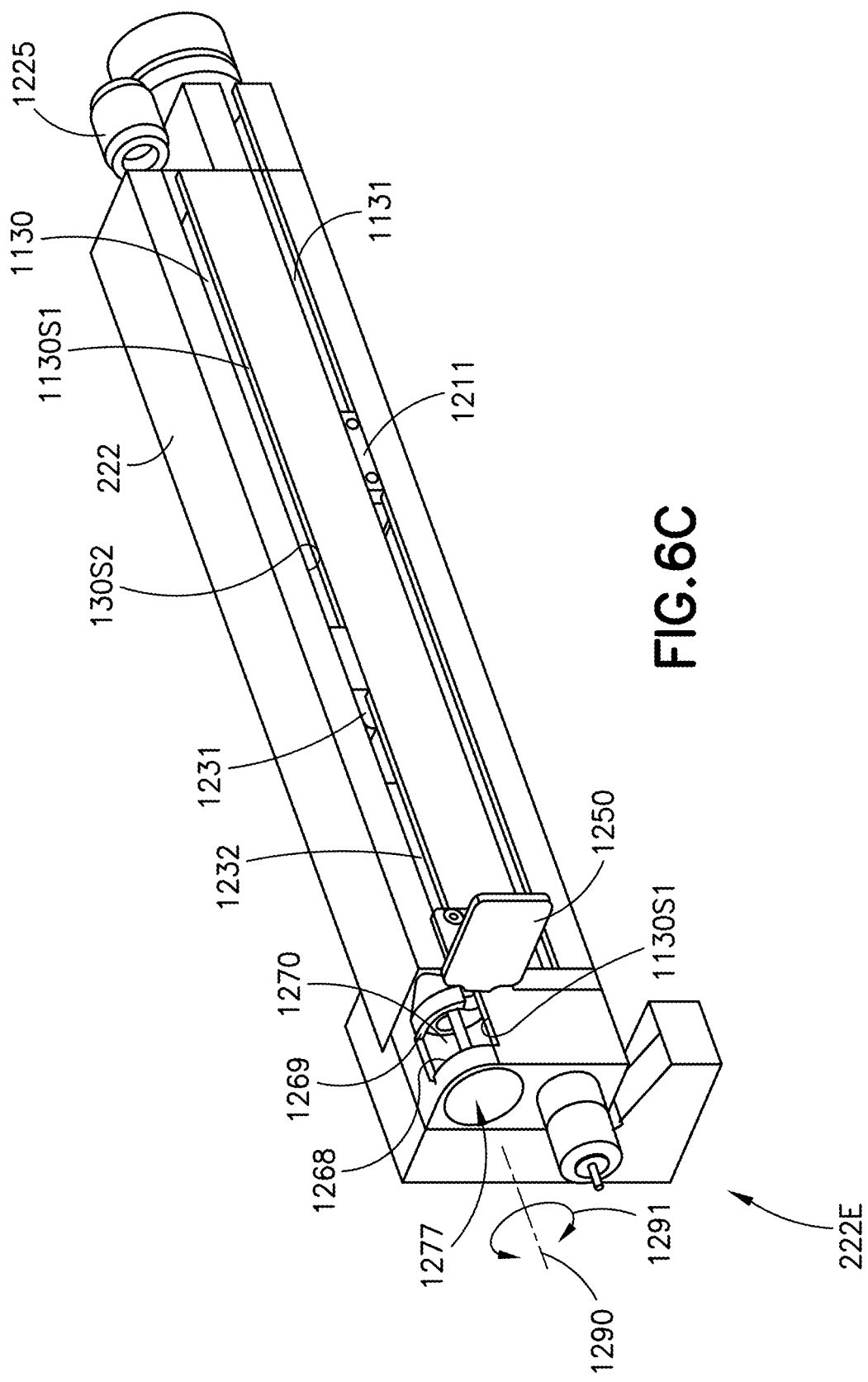

1230. The linear actuator 1210 is configured to move the rotating slider assembly 1230 in direction LAT along the slot 1131 in any suitable manner. The rotating slider assembly 1230 includes a non-rotating plug 1231 and a rotating carrier 1232. A suitable example of the rotating slider assembly is described in, for example, U.S. patent application Ser. No. 17/664,944 filed on May 25, 2022 and titled "Autonomous Transport Vehicle," the disclosure of which was previously incorporated herein by reference in its entirety. A puller arm or tab 1250 is coupled to the rotating carrier 1232 in any suitable manner, such as with suitable fasteners. The non-rotating plug 1231 is configured to linearly slide in direction LAT, within a channel 1277 of the justification bar 222, under impetus of the linear actuator 1225. The rotating carrier 1232 includes a tab mount portion 1260 and is movably coupled to the non-rotating plug 1231 by a caromed engagement configured to provide rotation of the rotating carrier 1232 relative to the non-rotating plug 1231 as the non-rotating plug 1231 is moved in direction LAT relative to the rotating carrier 1232. For example, FIG. 6A illustrates the tab 1250 in a retracted position while FIG. 6B illustrates the tab 1250 in a deployed position. The tab 1250 is rotated from the deployed position by driving the actuator 1225 to move the non-rotating plug 1231 in direction LAT1. Movement of the non-rotating plug 1231 in direction LAT1 causes the caromed engagement to rotate the tab 1250 in direction 1291B, where the rotating carrier 1232 is held stationary in direction LAT at least in part by stop surface 1260S1 of the rotating carrier 1232 engaging stop surface 1269 of the channel 1277. The channel 1277 includes a slot or aperture 1270 disposed adjacent an end 222E, 223E of the justification bar 222 (and 223) closest the transfer opening 1199 of the payload bed 210B. The slot 1270 intersects slot 1130. Here, movement of the non-rotating plug 1231 in direction LAT1 under impetus of linear actuator 1225 causes rotation of the stop surfaces 1260S1, 1260S2 (and tab 1250 of the rotating carrier 1232) towards the slot 1130 in direction 1291A (via caroming engagement of the one or more protrusions 1263P and the corresponding recesses 1235R) where the rotating carrier 1232 is held from movement in direction LAT1 by engagement of stop surface 1260S1 of the rotating carrier 1232 with stop surface 1269 of the channel 1277. Continued rotation of the rotating carrier 1232 effected by movement of the non-rotating plug 1231 in direction LAT1 causes disengagement of the stop surfaces 1260S1, 1269 and alignment of stop surfaces 1260S1, 1260S2 with slot 1130. With the stop surfaces 1260S1, 1260S2 aligned with slot 1130, rotation of the rotating carrier 1232 is arrested (via abutting contact between stop surfaces 1260S1, 1260S2 with sides 1130S1, 1130S2 of slot 1130) and the rotating carrier 1232 moves with the non-rotating plug 1231 in direction LAT1. Rotation of the tab 1250 in direction 1291B occurs in a substantially opposite manner to that described above with the non-rotating plug 1231 moving in direction LAT2 where stop surface 1260S2 of the rotating carrier 1232 engages stop surface 1268 of the channel 1277. The stop surfaces 1260S1, 1260S2 extend from the rotating carrier 1232 so as to engage a respective one of stop surfaces 1268, 1269 of the channel 1277. The tab mount portion 1260 is shaped and sized to as to slide or otherwise pass within the channel 1277. The tab 1250 is coupled to the tab mount portion 1260 at coupling 1262 so that the tab 1250 extends away from and is cantilevered from the tab mount portion 1260.

An exemplary illustration of the tab 1250 rotation and linear movement described above is illustrated in FIGS. 5A-5C. The justification bars 222, 223 are moved towards each other in direction LON so as to substantially contact case unit(s) CU held at least partially within the payload bed 210B. As can be seen in FIG. 5A the tabs 1250 of each respective justification bar 222, 223 are rotated in direction 1291 (e.g., through relative movement between the non-rotating plug 1231 and rotating carrier 1232 effected by the respective linear actuator 1225) about a respective rotation axis 1290 from the retracted position (FIG. 5A) to the extended position (FIG. 5B). The linear actuator 1225 of each respective justification bar 222, 223 continues to operate so that the non-rotating plug 1231 and rotating carrier 1232 (e.g., the rotating slider assembly 1230) are moved as a unit in direction LAT1 to pull case units into the payload bed 210B. Movement of the rotating slider assembly in direction LAT2 and rotation of the tabs 1250 from the extended position to the retracted position occurs in a substantially opposite manner. It is noted that the configuration of the puller assembly 1120 is exemplary only and the puller assembly may have any other suitable configuration such as those described in U.S. patent application Ser. No. 17/664,944 incorporated by reference herein as noted above.

As noted above, the aspects of the disclosed embodiment provide for health assessment of components of the automated storage and retrieval system 100, such as autonomous transport vehicles 110 or other suitable components of the automated storage and retrieval system 100 for which a conservative motion may be determined. The aspects of the disclosed embodiment employ, for example, existing control loops (such as feedback control loops) of the automated storage and retrieval system 100 components for health assessment such that additional sensors (such as those dedicated to health assessment data retrieval) are not employed (although, it is noted, in some aspects additional sensors may be provided for determining the conservative motion). The aspects of the disclosed embodiment may allow for any suitable controller (represented by the representative controller REPCON of FIG. 1A) of the automated storage and retrieval system 100 to determine conservative motions of the components controlled by the controller. These conservative motions may be compared to a conservative motion in a base condition (see FIG. 11A which illustrates a representative conservative motion in a base condition and FIG. 11B which illustrates a representative conservative motion of an unhealthy component) to determine a health of the automated storage and retrieval system 100 component. As a result, the aspects of the disclosed embodiment may allow for the controller of the automated storage and retrieval system 100 to perform predictions based on any suitable trending analysis, allowing the controller to make recommendations for preventative maintenance based on the conservative motions.

Referring again to FIGS. 1 and 1A, the aspects of the disclosed embodiment may operate in hardware or software. For example, the aspects of the disclosed embodiment may reside in a computer controller, a controller that directs the operation of a number of components, a controller that controls a component subsystem, or a system controller. The aspects of the disclosed embodiment may also be implemented in dedicated hardware or software. The controller is any suitable controller of the automated storage and retrieval system and will be described with respect to representative controller REPCON for exemplary purposes only. It should be understood that each component of the automated storage and retrieval system 100 has a respective controller (which may be substantially similar to the representative controller REPCON). For example, each autonomous transport vehicle 110 includes a respective controller 1220. The lift modules 150A, palletizers 162 and other automated mechatronic components of the storage and retrieval system may also include respective controllers 15000N, 164, 164'. These controllers 1220, 15000N, 164, 164' are in communication with the control server 120 (which may also be similar to the representative controller REPCON) through any suitable wired and/or wireless network 180. The control server 120 is in communication with the warehouse management system 2500 (which may also be similar to the representative controller REPCON) through the network 180. In accordance with aspects of the disclosed embodiment, the health assessment of a component may be performed by the respective controller 1220, 15000N, 164, 164' where the results of the health assessment are communicated to one or more of the control server 120 and warehouse management system 2500 for presentation to a user through any suitable user interface. In accordance with the aspects of the disclosed embodiment, the health assessment of a component may be performed at least in part by the respective controller 1220, 15000N, 164, 164' and at least in part by one or more of the control server 120 and warehouse management server 2500, where the one or more of the control server and warehouse management server 2500 collect health assessment data from one or more components and determine health assessment trends and health predictions/preventative maintenance for the one or more components. As described herein, the health assessment data may be collected "passively" (i.e., without dedicate sensors) such as from the feedback control loops of the automated system being assessed (which for exemplary purposes is the autonomous transport vehicle 110 but may be any suitable automated feature of the automated storage and retrieval system including but not limited to the palletizers, depalletizers, automated conveyors, lifts, etc.), and/or "actively" with at least one sensor 110DN coupled to the controller REPCON that is configured to sense predetermined operational data of a respective autonomous transport vehicle component (e.g., the at least one sensor 110DN may include at least one motion sensor for sending the predetermined operational data of the transfer arm 210A for at least one degree of freedom of motion of the transfer arm 210A).

As noted above, the controller is any suitable controller of the automated storage and retrieval system 100 and will be described with respect to the representative controller REPCON. The controller REPCON generally includes a processor 101, read only memory 102, random access memory 103, program storage 104, a user interface 105, and network interface 106. The processor 101 may include an onboard cache 101C and is generally operable to read information and programs from a computer program product, for example, a computer readable medium, such as on board cache 101C, read only memory 102, random access memory 103, and program storage 104.

Upon power up, the processor 105 may begin operating programs found in read only memory 102 and after initialization, may load instructions from program storage 104 to random access memory 103 and operate under control of those programs. Frequently used instructions may be temporarily stored in on board cache 101C. Both read only memory 102 and random access memory 115 may utilize semiconductor technology or any other appropriate materials and techniques. Program storage 104 may include one or more of a diskette, a memory card, a computer hard drive, a compact disk, a digital versatile disk, an optical disk, a chip, a semiconductor, or any other device capable of storing programs in the form of non-transitory computer readable code.

On board cache 101C, read only memory 110, random access memory 115, and program storage 120, either individually or in any combination may include operating system programs. The operating system programs may be supplemented with an optional real time operating system to improve the quality of data provided by the controller REPCON and to allow the controller REPCON to provide a guaranteed response time.

In particular, onboard cache 101C, read only memory 102, random access memory 103, and program storage 104, either individually or in any combination, may include programs for causing the processor 101 to perform health assessments as described herein. Network interface 106 may be generally adapted to provide an interface between controllers and to convey data between controllers. The controller REPCON may also include any suitable user interface UI with any suitable display and any suitable input device (e.g., keyboard) were the display and input device are resident on the apparatus of which the controller is a part or the input device and display may be releasably coupled to an input port of the user interface. In other aspects the user interface is a graphical user interface resident on the apparatus or releasably coupled thereto. The user interface US may be configured to guide a user, bases on health assessment, through one or more of troubleshooting, repair, and maintenance processes.

Figure 7:
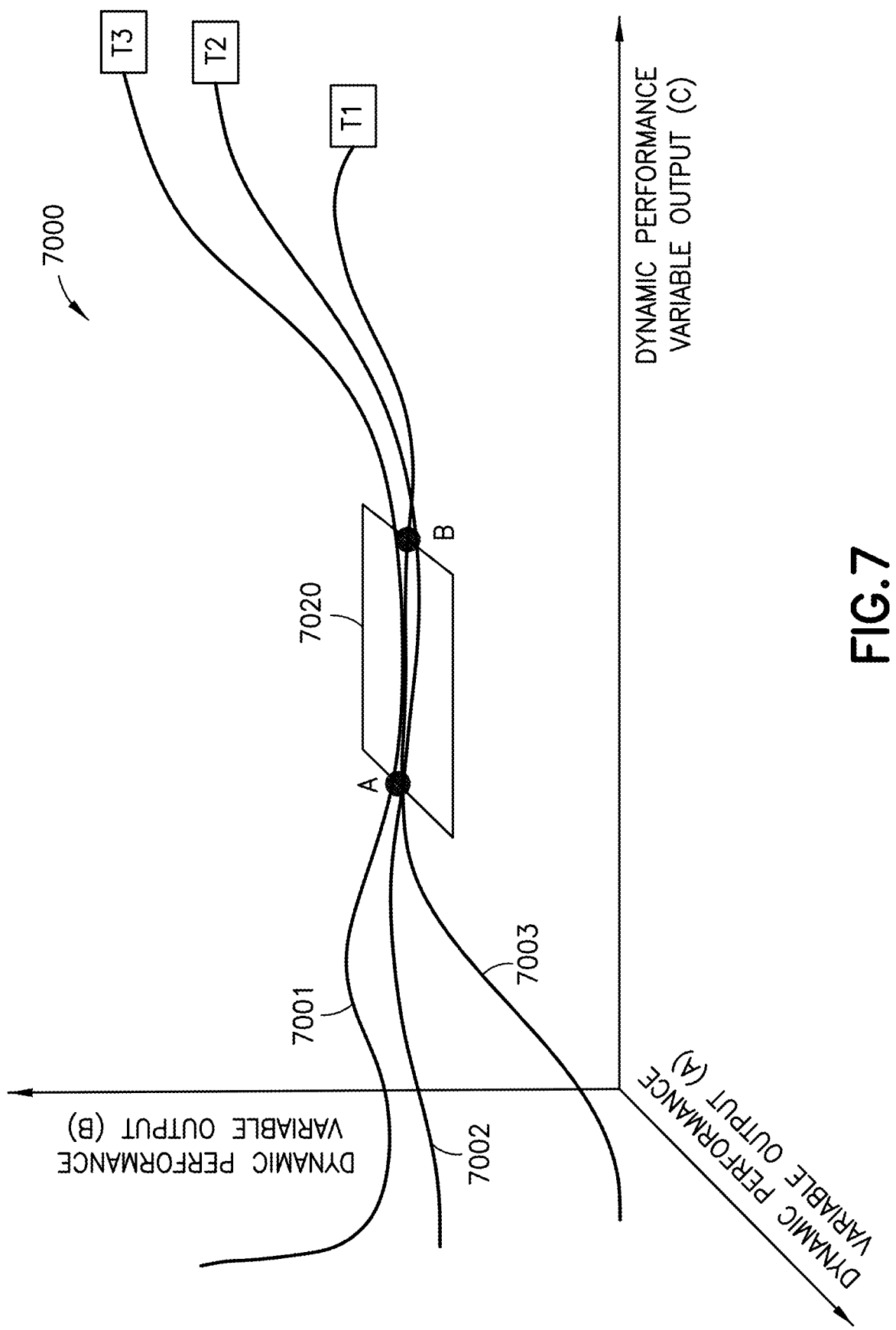
FIG. 7 is an exemplary illustration of a predetermined common motion manifold for a predetermined motion of the autonomous transport vehicle of FIG. 1 in accordance with aspects of the disclosed embodiment.

It is noted that the aspects of the disclosed embodiment are described herein with respect to an autonomous transport vehicle 110 but may be applied to any automated component of the automated storage and retrieval system 100 described herein. Referring to FIGS. 1, 1A, and 2A-2C, as described above, the autonomous transport vehicle 110 incudes a controller 1220 (see also FIG. 1A). The controller 1220 is connected to a drive section DS (see FIG. 1A) such as the drive section 110DS of the autonomous transport vehicle 110. Here, the drive section 110DS has at least one degree of freedom and may include one or more of motors/drive units 226, 261, 275, 390, 776. The controller 1220 is operably connected to the drive section 110DS and is configured to register (e.g., store in a memory record) predetermined operating data (e.g., of the drive section) embodying at least one dynamic performance variable output by the drive section 110DS effecting a predetermined motion (also referred to herein as a component event—see FIG. 8) of the autonomous transport vehicle 110. The at least one dynamic performance variable output by the drive section 110DS may be one or more of position, velocity, acceleration, torque (e.g., as determined by back electromotive force (EMF)), force (e.g., as determined by back electromotive force (EMF)), and time. Referring also to FIG. 7, the at least one dynamic performance variable output by the drive section 110DS forms a motion space 7000 in which a predetermined common motion (or convergence) manifold 7020 is defined and embedded. For exemplary purposes only the predetermined common motion manifold 7020 illustrated in FIG. 7 is a two dimensional manifold (e.g., embedded in a three dimensional space corresponding to dynamic performance variable output A, dynamic performance variable output B, and dynamic performance variable output 3 for times T1, T2, T3, . . . ), but in other aspects the predetermined common motion manifold 7020 may have more or less than two dimensions. It is noted with respect to FIG. 7 that the three dimensional output forms the motion/measurement space 7000, the three motions/trajectories 7001-7002 are included in the motion space 7000 and between points A and B all the motions 7001-7002 lie on or near the embedded manifold 7020, and the embedded manifold 7020 is a two dimensional surface in the motion/measurement space 7000.

The predetermined common motion manifold 7020 illustrated in FIG. 7 is representative of a predetermined motion/trajectory of the payload transport or transfer arm 210A in at least one direction; however, predetermined common motion manifolds may be generated for each (or anyone or more) degree of freedom of the drive section 110DS. The predetermined motion (also referred to herein as a component event—see FIG. 8) of the transfer arm 210A, from which a conservative motion or conservative motion component is derived, may be one or more of an extension of transfer arm 210A in one or more of directions LAT1, LAT2 (see FIG. 2A), a movement of one or more of the justification bars 222, 223 in one or more of directions LON1, LON2 (see FIG. 2B), a lifting or lowering of the payload bed 210B in direction VER (see FIGS. 2B and 2C), a movement of one or more tines 210AF of the transfer arm 210A in direction LON (e.g., one or more of directions LON1, LON2—see FIGS. 4A and 4B), a movement of tab 1250 from a deployed position to a retracted position or vice versa (see FIGS. 5A-5B and 6A-6C), a movement of tab 1250 in one or more of direction LAT1, LAT2 (see FIGS. 5C and 6A-6C), a movement of tab 1150 in one or more of direction LAT1, LAT2 (see FIGS. 5C and 6A-6C), a steady state motion (such as of the drive wheels 261W/drive wheel motor 261M where friction is a dynamic performance variable), or any other motion which the autonomous guided vehicle is capable of. In other aspects, the predetermined motion or component event may be any suitable motion event of the autonomous transport vehicle 110 including but not limited to those transfer arm 210A motions noted above, an actuation of a drive motor 261M that effects traverse of the autonomous transport vehicle 110 within the automated storage and retrieval system 100, and/or any other suitable motion or combination of motions.

Figure 1A:
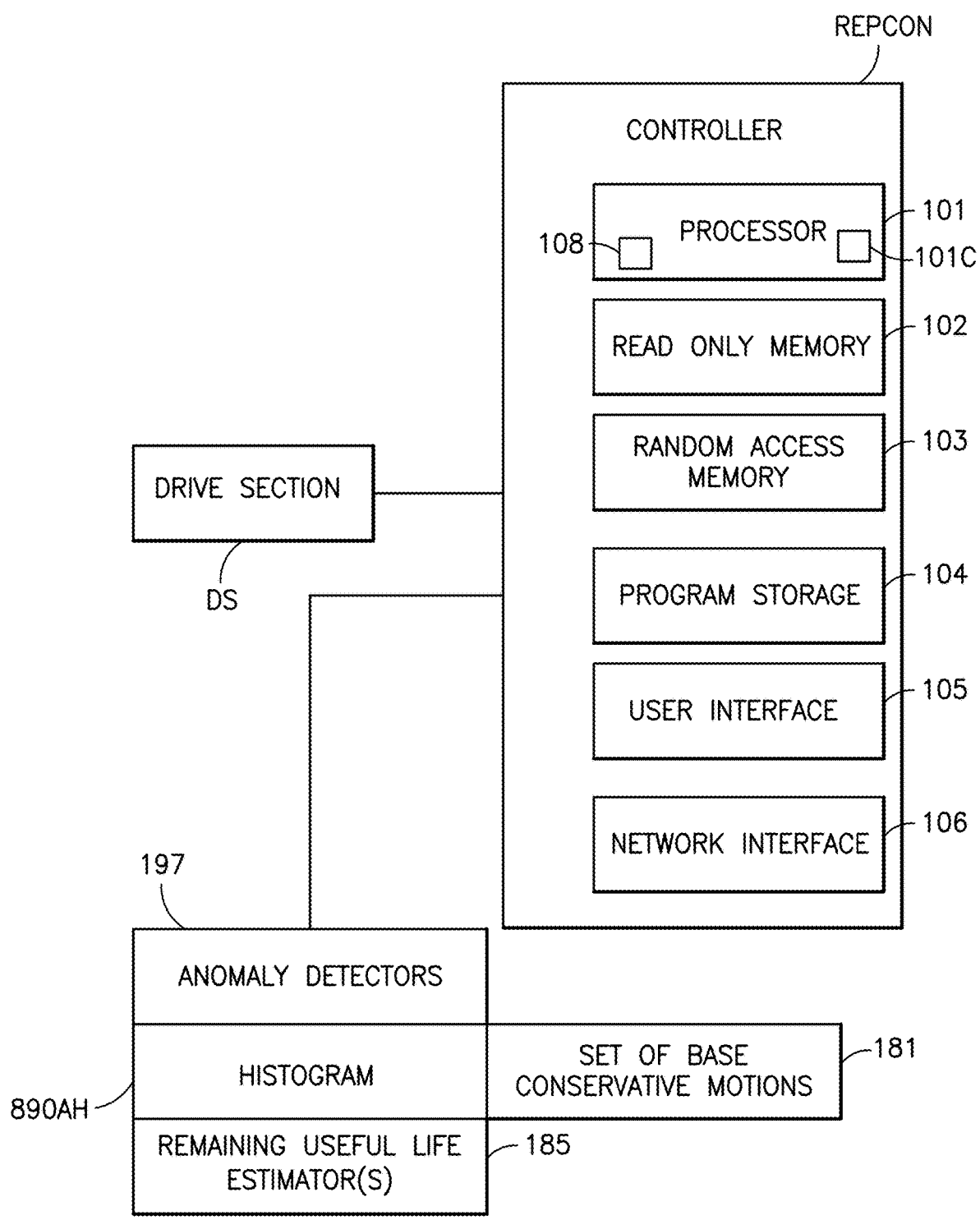
FIG. 1A is a schematic illustration of a representative controller of the automated storage and retrieval system of FIG. 1.

As can be seen in FIG. 1A, the controller 1220 (which is represented by the representative controller REPCON) includes a resolver 108 that is arranged to resolve (e.g., in any suitable manner such as pattern recognition, image analysis, numerically, etc.) from, the predetermined common motion manifold 7020, a conservative motion component 7010 of the predetermined motion. For example, trajectories 7001-7002 for the transfer arm 210A collapse onto a low dimensional manifold 7020 in the motion space 7000. The resolver is then applied on the manifold 7020 to simplify anomaly detection. Here, the conservative motion component 7010 is substantially common (e.g., shared) across each motion within the predetermined common motion manifold 7020. For example, as can be seen in FIG. 7, three motions/trajectories 7001-7003 are plotted in the motion space 7000 where the motions converge and substantially overlay on each other in the predetermined common motion (convergence) manifold 7020, where the predetermined common motion manifold 7020 represents the conservative motion component 7010 of the predetermined motions. While only three motions are illustrated for clarity and ease of explanation, it should be understood that the number of motions in the motion space 7000 and converging on the predetermined common motion manifold 7020 is sufficient to be a statistically characterizing number of motions so that the conservative motion component 7010 forms a baseline that is created from enough conservative motion components that are collected to define a statistically meaningful batch. Here, each motion 7001-7003 of the predetermined common motion manifold 7020 includes a conservative motion component 7010 (e.g., each motion/trajectory 7001-7003 includes a portion where the motions/trajectories 7001-7003 are near or on the embedded predetermined common motion manifold 7020), and the conservative motion component 7010 is substantially coincident (e.g., occurs at the same region or area of the manifold) for each motion 7001-7003 of the predetermined common motion manifold 7000. In the example provided of transfer arm 210A motion, the conservative motion component 7010 characterizes a payload independent component of each motion 7001-7003 of the predetermined common motion manifold 7020.

The conservative motion is embodied in the conservative motion component 7010 included in and resolved from a programmed move (such as moves 7001-7003 and shown in FIG. 7) of the transfer arm 210A that effects case CU transfer; or the conservative motion may be a standalone programmed transfer arm 210A move (in a known unloaded condition) that can be added (i.e., performed) before or after the programmed move 7001-7003 (e.g., an add-on conservative motion that is distinct from the transfer motion). Referring to FIG. 2B and a transfer arm 210A extension in direction LAT, the controller 1220 is programmed to effect actuation of the motor 275 for driving the finger support rail 273 along the linear guide rails 271, 272 to extend and retract the fingers 210AF (i.e., transfer arm extension and retraction for picking or placing a case unit). A standalone programmed conservative motion may be effected by the controller after placement of case CU or before picking of a case CU where the motor 275 is commanded by the controller to perform a move in one or more of directions LAT1, LAT2 with the transfer arm 210A unloaded (not carrying a payload). The standalone programmed conservative motion may be performed with the autonomous transport vehicle 110 in traverse motion along a picking aisle 130A or transfer deck 130B just prior to or just after a pick/place action so that transfer times and travel times of the autonomous transport vehicle 110 (i.e., time to pick/place and/or traverse) are not hindered by performance of the add-on conservative motion.

In accordance with the aspects of the disclosed embodiment, anomaly detectors 197 (see FIG. 1A) are trained to identify unhealthy operating data of the autonomous transport vehicle 110 based on the conservative motions in a base condition. An anomaly detector 197 for each degree of freedom of autonomous transport vehicle 110 motion may be generated and stored in any suitable memory of the controller 1220 (see the representative controller REPCON in FIG. 1A). The anomaly detectors 197 may be trained for pattern matching so as to compare unhealthy operating data of the autonomous transport vehicle 110 with healthy operating data of the autonomous transport vehicle 110.

In an anomaly detector 197 training phase the operational data for one or more, or each, degree of freedom (i.e., axis/axes of motion) of one or more autonomous guided vehicles 110 known to be healthy is gathered with the one or more autonomous guided vehicle 110 in operation (e.g., transporting cases CU in the normal course of order fulfillment) within the automated storage and retrieval system 100. For example, as noted herein the controller 1220 is configured to monitor and gather operational data that embodies at least one dynamic performance variable including, but not limited to, force, torque, position, acceleration, velocity, and time from the feedback control loops corresponding to the various motors 226, 261, 275, 390, 776 of the drive section 110DS. As noted herein, the dynamic performance variables can be directly measured (i.e., continuously monitored by dedicated sensors) or derived from available measurements/data (such as the feedback control loop data). Examples of dynamic performance variables that can be derived or measured include but are not limited to:

Motor pulse width modulation (PWM) duty: PWM duty of a motor is the percentage of input voltage that is supplied to each motor phase at any given time. The duty cycle at each of the motor phases is available to the health-monitoring and anomaly detection system described herein.

Motor current: Motor current represents the current flowing through each phase of a motor. The motor current may be obtained with an absolute value or as a percentage of the maximum current. If obtained as an absolute value it has units of amps. Motor current values can in turn be used to compute motor torques using motor torque-current relationships.

Actual position, velocity, and acceleration: These are the position, velocity, and acceleration of each of the motor axes. For rotational axes, the position, velocity, and acceleration values are in units of degrees, degrees/sec, and degrees/sec$^2$ respectively. For translational axes, the position, velocity, and acceleration values are in units of mm, mm/sec, and mm/sec$^2$ respectively.

Desired position, velocity, and acceleration: These are the position, velocity, and acceleration values that the controller commands the motors to have. These properties have similar units as the actual position, velocity, and acceleration noted above.

Position and velocity tracking error: These are the differences between the respective desired and actual values. These properties have similar units as the actual position, velocity, and acceleration noted above.

As may be realized force and torque on any given axis may be determined from at least the motor current.

Figure 9:
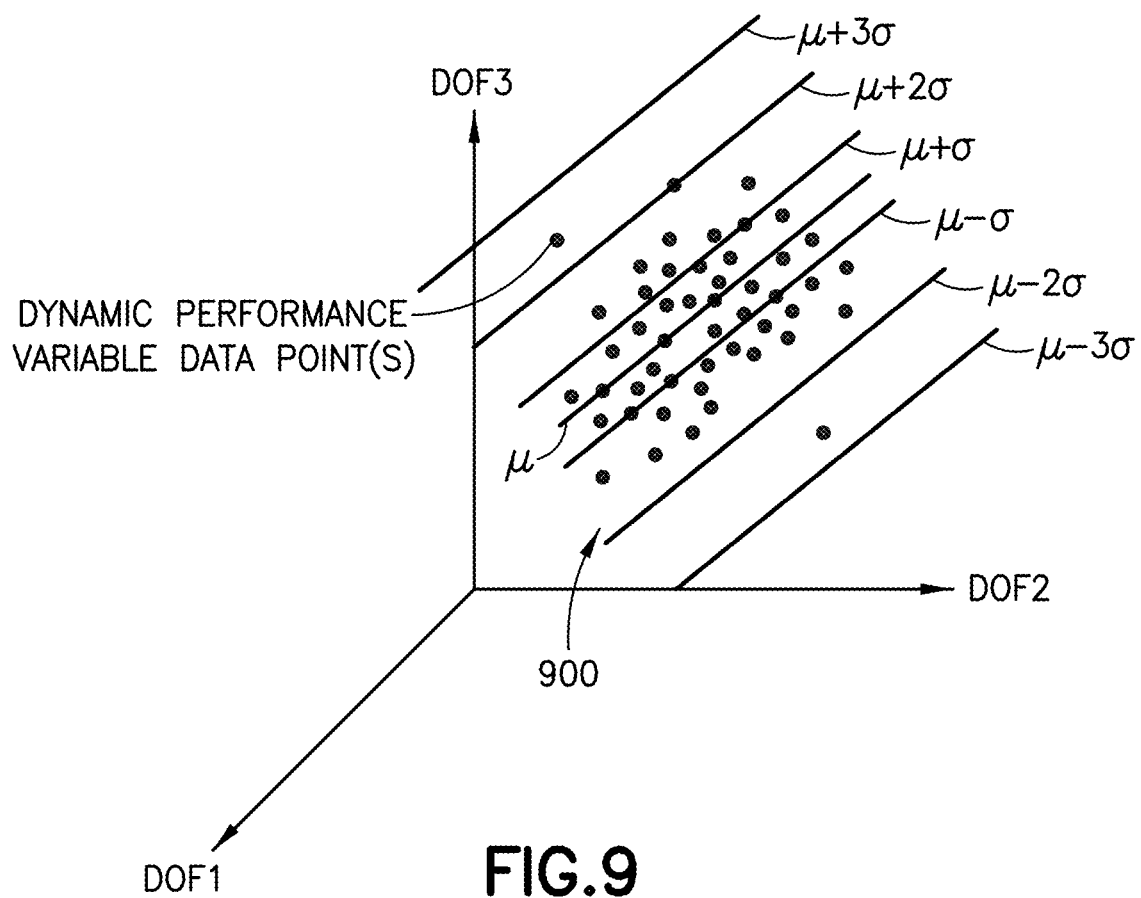
FIG. 9 is an exemplary illustration of data points embedded on a surface of a predetermined common motion manifold in accordance with aspects of the disclosed embodiment.
Figure 10:
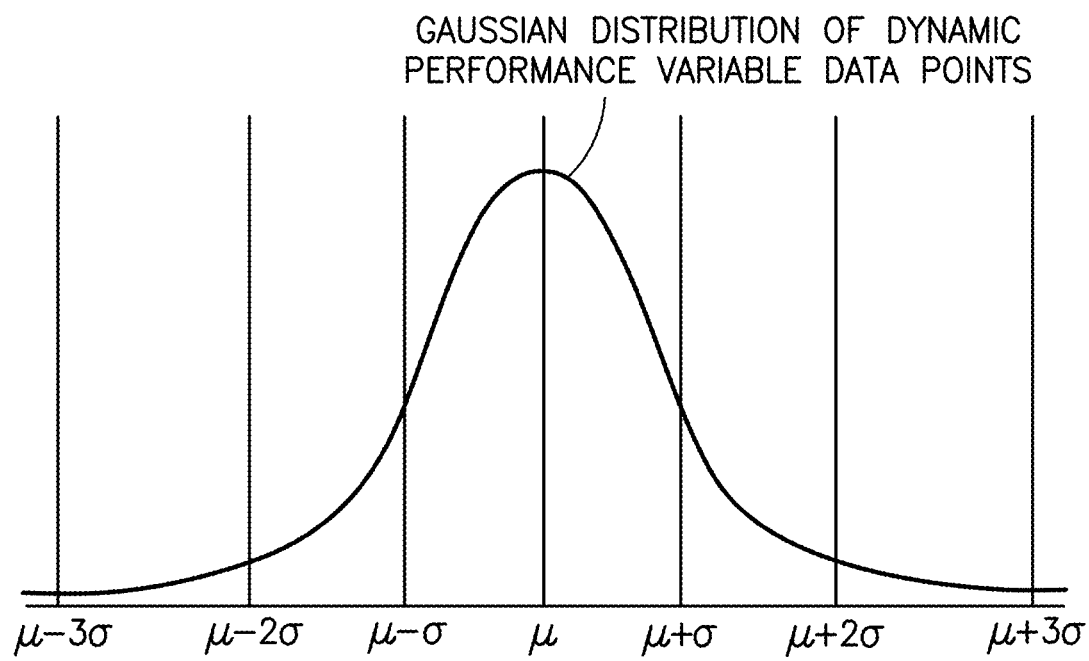
FIG. 10 is an exemplary representative Gaussian distribution of the data points of FIG. 9 in accordance with aspects of the disclosed embodiment.

It is noted that in operation the autonomous transport vehicles 110 transfer diverse payloads such that at least a weight of a load being carried may be unknown. This diverse payload transfer provides for a Gaussian distribution of operational data points (for each degree of freedom axis of motion) embodying the at least one dynamic performance variable (see FIG. 9 for an illustrated of the data points embedded on a surface of a predetermined common motion manifold 900 and FIG. 10 for a representative Gaussian distribution of those data points). As noted above, these data points are sufficient to provide a statistically meaningful standard deviation (see FIGS. 9 and 10), and which at least one dynamic performance variable output by the drive section 110DS effects defining of the predetermined common motion manifold 900 from which a statistically meaningful number of conservative motions/conservative motion components for a given degree of freedom/axis of motion are derived. It is noted that the predetermined common motion manifold 900 is illustrated as being formed by dynamic performance variable data points from three exemplary degrees of freedom of the drive section 110DS but in other aspects, the predetermined common motion manifold may be formed by dynamic performance variable data points from one or more axes of motion/degrees of freedom of the drive section 110DS (see FIG. 7 where the predetermined common motion manifold 7000 is generated with dynamic performance variables A, B and time with respect to a single degree of freedom/axis of motion.

Figure 8B:
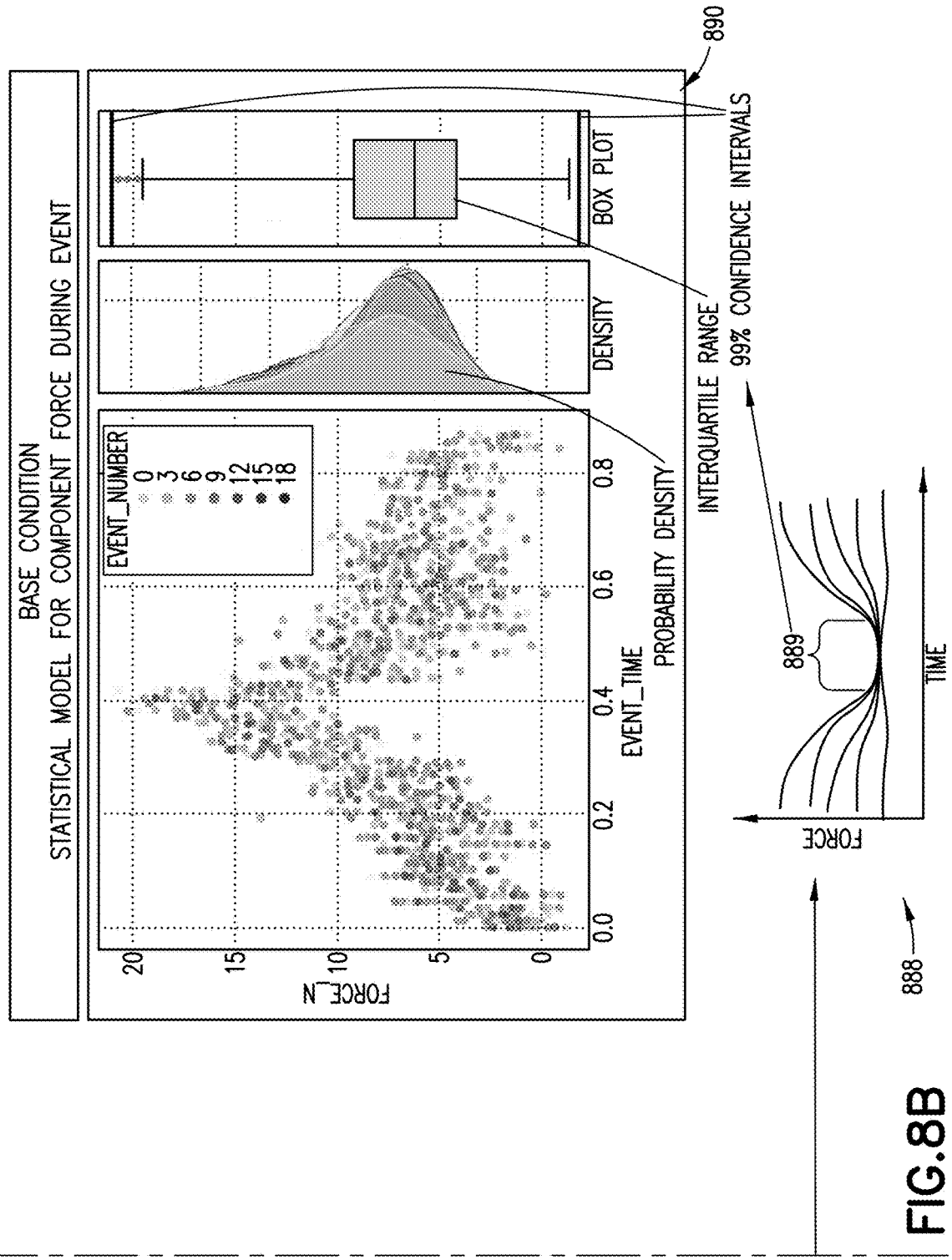
FIG. 8 is a schematic illustration of exemplary base condition performance data for a predetermined motion of the autonomous transport vehicle of FIG. 1 in accordance with aspects of the disclosed embodiment.

Referring also to FIG. 8, the predetermined common motion manifold 900, 7000, from which the base condition conservative motion 7010 is resolved, may be generated from at least one dynamic performance variable output from one autonomous transport vehicle 110 or more than one autonomous transport vehicle. FIG. 8 illustrates several dynamic performance variables output from a base condition component event (i.e., an event performed by an autonomous transport vehicle 110 that is known to be healthy), also referred to herein as a predetermined motion, such as extension of the transfer arm 210A in direction LAT2. The dynamic performance variables include but are not limited to position, velocity, acceleration, force (and/or torque), and time. Where there are one or more than one (healthy) autonomous transport vehicle 110 providing data to generate the predetermined common motion manifold 7000 the controller 1220 of each autonomous transport vehicle 110 may communicate the performance variables to control server 120 (or warehouse management system 2500) where the performance variables are registered by the control server 120 in one or more base condition dynamic performance variable output logs (each log corresponding to a respective autonomous transport vehicle 110).

As may be realized, a predetermined common motion manifold 888 may be generated for and correspond to a different autonomous transport vehicle 110 component (e.g., such as the transfer arm 210A or other suitable component) motions in each different direction of at least one direction of movement of the component, determined by each different degree of freedom of at least one degree of freedom of the drive section 110DS (e.g., the component event of FIG. 8 may be a movement of the transfer arm in direction VER1, in direction VER2 (see FIG. 2B), in direction LAT1, and/or in direction LAT2 where a respective predetermined common motion manifold is generated for movement in each respective direction). Here, resolution of the base condition conservative motion component 889, 7010 at the control server 120 (e.g., for each different corresponding predetermined common motion manifold) may provide for minimization of processing power of the controller 1220 to reduce costs of the autonomous transport vehicle 110; while in other aspects, the controller 1220 may receive the performance variables of one or more different autonomous transport vehicles 110 where the performance variables, from the other autonomous transport vehicles 110 and the transport vehicle 110 of which the controller 1220 is a part, are stored in one or more base condition dynamic performance variable output logs onboard the autonomous transport vehicle 110 (e.g., in any suitable memory such as those described herein) for processing in the manner described herein with respect to control server 120.

The dynamic performance variable data registered in the one or more base condition dynamic performance variable output logs are used by the control server 120 to generate a predetermined common motion manifold 888. For exemplary purposes only, the predetermined common motion manifold 888 is a two-dimensional manifold on which the force data points for one or more of autonomous transport vehicles BOT1-BOTn are embedded (where the autonomous transport vehicles BOT1-BOTn are substantially similar to autonomous transport vehicles 110 and n is an integer denoting an upper limit to a number of autonomous transport vehicles). It should be understood that a predetermined common motion manifold may be generated for each of force (or torque), acceleration, velocity, and position with respect to time may be generated and from which a conservative motion component is resolved in the manner described herein. IN other aspects, more than one force (or torque), acceleration, velocity, and position with respect to time may be employed to generate the predetermined common motion manifold.

The control server 120 includes a resolver 108 (see FIG. 1A—again noting the representative controller REPCON is representative of any of the controller 1220, control server 120, palletizer control 164, 164', and warehouse management system 2500 and any other controller of the automated storage and retrieval system 100) that resolves from the predetermined common motion manifold 888 the conservative motion components 889 of the predetermined motions in the predetermined common motion manifold 888. As noted above, a predetermined common motion manifold 888 may be generated for each different transport motion of the autonomous transport vehicle 110 component such that the control server 120 is configured to resolve a respective conservative motion (e.g., defined by the conservative motion component 889) of the autonomous transport vehicle 110 component in each different corresponding predetermined common motion manifold 888 that corresponds to a different autonomous transport vehicle 110 component (e.g., such as the transfer arm 210A or other component) motion in each different direction (e.g., with respect to the transfer arm 210A directions VER1, VER2, LAT1, LAT2, etc.) of the at least one direction, determined by each different degree of freedom (for the respective autonomous transport vehicle component being moved/actuated) of the at least one degree of freedom of the drive section 110DS.

It is noted that because the common motion manifold 888 is generated from data received from healthy autonomous transport vehicles 110, the conservative motion components 889 may be referred to as being in a base condition (e.g., baseline data that effects a comparison with operational data for health assessment as described herein). As can be seen in FIG. 8 the conservative motion components 889 of the predetermined motions is substantially common across each of the predetermined motions within the common motion manifold 888, illustrating that the conservative motion components 889 are ideal or fundamental actions (e.g., independent of payload and not confounded by object manipulation motions), repeatable, and detectable, and as such, are a characterization of health of the components of the autonomous transport vehicle 110 effecting the predetermined motion. Each conservative motion component 889 is based on one or more of a torque command in at least one degree of freedom of the drive section 110DS, and a position command in at least one direction of autonomous transport vehicle 110 component (such as the transfer arm 210A or other component) motion. Here, the at least dynamic performance variable output resultant from the one or more torque command and position command, is decoupled from the payload (such as a case CU carried by the transfer arm 210A) or a presence of the payload engaged by the autonomous transport vehicle 110 component in motion.

With the conservative motion component(s) 889 resolved, the control server 120 (or other suitable controller of the automated storage and retrieval system 100) is configured to determine from the registered predetermined operating data (such as that in the dynamic performance variable output logs—see FIG. 8) a base predetermined characteristic 890 characterizing, each of the at least one dynamic performance variable (e.g., force or torque, acceleration, velocity, position, time, etc.), of the conservative motion of the autonomous transport vehicle 1110 component (e.g., such as the transfer arm 210A) in the base condition. As an example, the control server 120 is configured to generate a base condition statistical model (see FIG. 8) from the data points of the conservative motion components 889 in the base condition, where the statistical model is a model of a given dynamic performance variable of a healthy autonomous transport vehicle 110 component to which the given dynamic performance variable belongs. The data points of the conservative motion components 889 in the base condition are statistically modelled, in any suitable manner, such that the statistical model provides for a comparison (as described herein) between the base predetermined characteristic 890 and a corresponding operational characteristic. The statistical model embodies the base predetermined characteristic 890. In the example illustrated in FIG. 8, the statistical model is generated for the force dynamic performance variable from the data points of the conservative motion components 889 in the base condition (noting statistical models may also be generated for each of the other different dynamic performance variables from data points of the respective conservative motion components in the base condition), and the base predetermined characteristic 890 is a histogram (e.g., a representation of a distribution of numerical data) illustrated in FIG. 8 as a probability density plot, a box plot, or other dataset with known bounds delimited by the "healthy" data points of the conservative motion components 889 in the base condition.

The statistical model embodying the base predetermined characteristic 890 may be transmitted from the control server 120 to each of the autonomous transport vehicles 110 operating in the automated storage and retrieval system 110. Here, the individual autonomous transport vehicles 110 may perform a "self" health assessment by comparing respective operational dynamic performance variable data with the base predetermined characteristic in the manner described herein. In other aspects, each of the autonomous transport vehicles 110 may communicate the respective operational dynamic performance variable data to the control server 120 where the control server performs the health assessment for each of the autonomous transport vehicles 110 for which the respective operational dynamic performance variable data was received. For exemplary purposes, the health assessment comparison will be described as being performed, at least partially, onboard the autonomous transport vehicle 110; however, it should be understood that health assessment at the control server 120 is performed in a substantially similar manner.

Referring to FIGS. 1, 1A, 2A-2C, and 11, the controller REPCON (which in this example is the controller 1220) is configured to collect the predetermined operating data 1100 of the autonomous transport vehicle 110 in an operational condition (e.g., the statistical models have been created and registered in a memory of the controller 1220 and the autonomous transport vehicle 110 is operating within the storage and retrieval system 100 with an unknown or to be determined health status). In a manner similar to that described above in the anomaly detector 197 training phase, the predetermined operating data 1100 is collected by the controller 1220 from feedback control loops of the component being assessed for health and/or sensors 110DN configured to sense the predetermined operating data of the component being assessed for health. The collected predetermined operating data 1100 is registered in any suitable memory of the controller 1220 (such as those described herein with respect to controller REPCON) in a manner similar to that described herein. For example, the controller 1220 has a registry (such as one or more operational dynamic performance variable output logs stored in any one or more of the memories in FIG. 1A) disposed to register a histogram 890AH of the predetermined motion, and the defined predetermined common motion manifold 888A thereof, effected by the autonomous transport vehicle component (such as the transfer arm 210A), and the controller 12220 resolves the conservative motion component 889A from repeated access of the histogram 890AH.

The controller 1220 is configured to determine from the registered predetermined operating data 1100 an operating predetermined characteristic 890A characterizing, each of the at least one dynamic performance variable e.g., force or torque, acceleration, velocity, position, time, etc.) output, of the conservative motion component 889A of the autonomous transport vehicle 110 component (e.g., such as the transfer arm 210A) in an operating condition. In a manner similar to that described above, with respect to the training phase, the controller 1220 includes the resolver 108 that is arranged to resolve from a predetermined common motion manifold 888A (e.g. generated from the registered operational dynamic performance variables) a conservative motion component 889A of the predetermined motion of the drive section 110DS (e.g., a motion of the transfer arm 210A). As described above, the conservative motion component 889A, in the operating condition, is substantially common across each motion within the predetermined common motion manifold 888A.

The controller 1220 is configured to compare the base predetermined characteristic 890 and the operating predetermined characteristic 890A for each of the at least one dynamic performance variable output by the drive section 110DS, assessing the health of the autonomous transport vehicle 110 component (which in this example is the transfer arm 210A) based on the comparison. As can be seen in FIG. 11, the data points of the operating predetermined characteristic 890A may be overlaid onto the base predetermined characteristic 890, where healthy data points of the operating predetermined characteristic 890A remain within the bounds of the base predetermined characteristic 890 and unhealthy data points of the operating predetermined characteristic 890A exist outside the bounds of the base predetermined characteristic 890. For exemplary purposes only, the operating predetermined characteristic 890A corresponds with the force dynamic performance variable output by the drive section 110DS during the operating component event of transfer arm 210A extension in direction LAT1 and the base predetermined characteristic 890 corresponds with the force dynamic performance variable output by the drive section 110DS during the base component event of transfer arm 210A extension in direction LAT1. Here, where the controller 1220 determines, from the comparison, that the operating predetermined characteristic 890A is healthy, the controller 1220 continues to monitor (as described herein) the operational performance data for the component event through repeated access to the histogram 890AH (which may be updated to include operational data for each additional/new move for the component event) until and/or beyond a point in time an anomaly (e.g., unhealthy data) is detected. Where the controller 1220 determines, from the comparison, that the operating predetermined characteristic 890A is unhealthy, the controller 1220 communicates with a user of the automated storage and retrieval system 100 (e.g., via the user interface UI of the controller 1220, the control server 120, the warehouse management system 2500 or any other suitable user interface of the storage and retrieval system 100 in communication with the controller 1220 including, but not limited to, laptops, mobile phones, tablet computers, etc.) that the autonomous transport vehicle 110 is in need of maintenance, and in particular the transfer arm 210A extension drive system requires maintenance. As may be realized, the extension of the transfer arm 210A is only exemplary and the health assessment of any suitable component (such as described herein) of the autonomous guided vehicle 110 may be assessed in a manner substantially similar to that described above.

Where the autonomous transport vehicle 110 is determined to require maintenance, the autonomous transport vehicle 110 may traverse one or more of the transfer deck 130B and picking aisles 130A to a maintenance zone MZ of a respective storage structure level 130L of the automated storage and retrieval system 100. In one aspect, the maintenance zone MZ is configured to effect autonomous transport vehicle 110 induction and removal from the automated storage and retrieval system. The maintenance zone MZ may include an autonomous transport vehicle induction/removal interface substantially similar to rover interface described in U.S. Pat. No. 9,656,803 issued May 23, 2017 and titled "Storage and Retrieval System Rover Interface," the disclosure of which is incorporated herein by reference in its entirety. In other aspects, the maintenance zone MZ may also include (or have in lieu of the induction/removal interface) user workstations at which an autonomous transport vehicle 110 may receive maintenance such as the swapping/replacement of field replaceable units (e.g., motor modules, actuators, transport arm components, etc.) without removing the autonomous transport vehicle 110 from the automated storage and retrieval system 100.

As described herein, the conservative motion component(s) 889 (and the conservative motion corresponding thereto, whether part of a predetermined motion that transfers payload or a standalone programmed move) is determined for each degree of freedom of movement of the autonomous transport vehicle 110. For example, where the autonomous transport vehicle 110 has a traverse axis (e.g., effected by drive unit 261), a transfer arm lift axis (effected by motor 390), a transfer arm extension axis (effected by motor 275), a justification bar 222, 223 lateral traverse axis (effected by respective motor 226), a transfer arm finger 210AF lateral traverse axis (e.g., effected by actuator 776), etc., a base conservative motion 889 and base predetermined characteristic 890 is determined for each direction of motion for each axis of motion. The conservative base motions 889 and base predetermined characteristics 890 identify or otherwise form a set of base conservative motions 181 (registered in a memory of the controller REPCON) that are representative of a full set of motions of the autonomous transport vehicle 110. As described herein, each conservative motion in the set of base conservative motions 181 is unconfounded by object manipulation motions, repeatable, and detectable, and as such, are a characterization of health of the components of the autonomous transport vehicle 110 effecting the predetermined motion.

Figure 12:
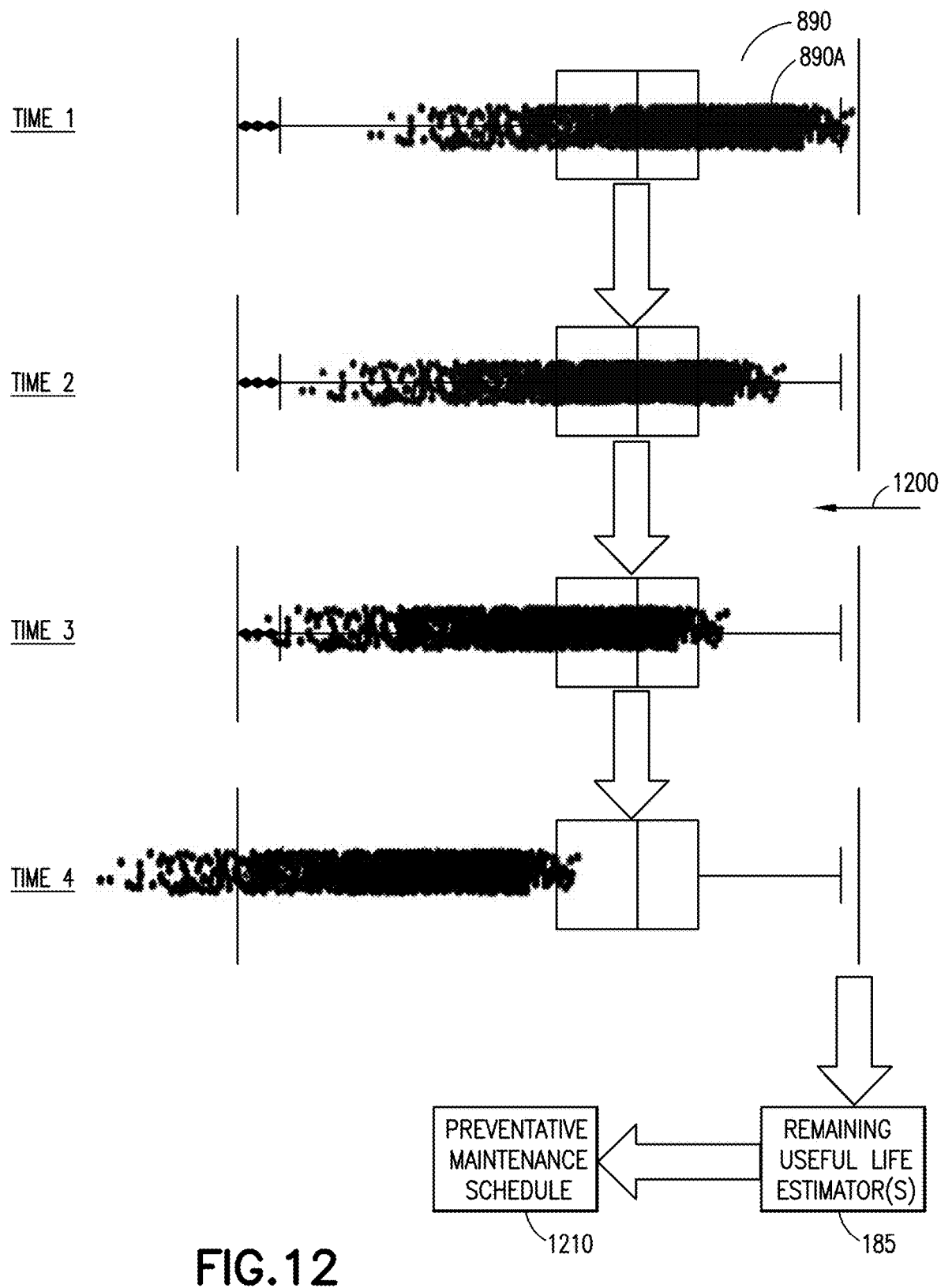
FIG. 12 is an exemplary illustration of an operating predetermined characteristic of operational performance data migration relative to base predetermined characteristic of base condition performance data, with respect to anomaly detection and remaining useful life determination, in accordance with aspects of the disclosed embodiment.

Referring to FIGS. 1, 1A, 2A-2C, and 12, the controller REPCON is configured, in any suitable manner, to determine a remaining useful life of the components of the autonomous transport vehicle 110 corresponding to the conservative motions. For example, as can be seen in FIG. 12, the operating predetermined characteristic 890A may migrate relative to the base predetermined characteristic 890 over time. As illustrated in FIG. 12, the operating predetermined characteristic 890A remains within the bounds of the base predetermined characteristic 890 during time 1, time 2, and time 3 but migrates in direction 1200. At time 4, the operating predetermined characteristic 890A has migrated in direction 1200 outside the bounds of the base predetermined characteristic 890 and is an indication that the autonomous transport vehicle 110 component corresponding to the operating predetermined characteristic 890A is unhealthy and requires maintenance. The controller REPCON may be programmed with any suitable remaining useful life estimators (including but not limited to artificial neural networks, degradation profile comparison (e.g., run-to-failure data comparison), survival function plots (e.g., lifetime data analysis algorithms), threshold data analysis algorithms, etc.) that correlates the migration of the operating predetermined characteristic 890A to time so as to determine the remaining useful life and provide a preventative/predictive maintenance schedule 1210 for the components of the autonomous transport vehicle 110.

Figure 13:
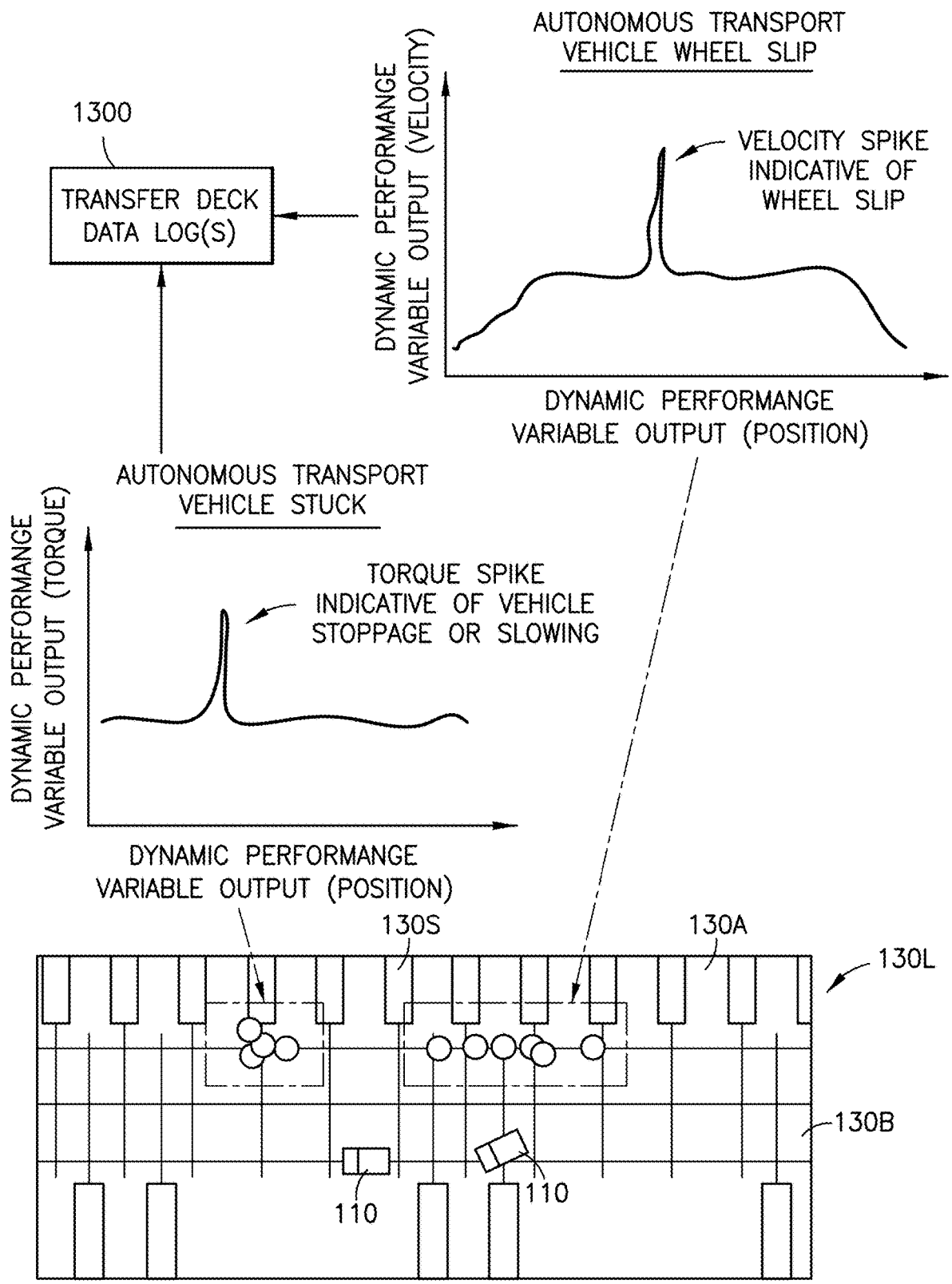
FIG. 13 is an exemplary illustration of storage and retrieval system anomaly determination in accordance with aspects of the disclosed embodiment.

The aspects of the disclosed embodiment may also opportunistically determine storage and retrieval system 100 structure (such as the picking aisles, storage shelves, transfer deck, or any other structure that the autonomous transport vehicle interacts with) health by employing the data gathered from the autonomous transport vehicles 110. For example, autonomous transport vehicle 110 interaction with the transfer deck 130B or picking aisles 130A may be indicative of anomalies on/of the traverse surface VRS (see FIG. 1) of the transfer deck 130B or picking aisles 130A. Referring to FIG. 13, dynamic performance variables output by the drive system 110DS, and in some aspects, position sensors of the autonomous transport vehicle 110, and received by the controller 1220 (with the autonomous transport vehicle 110 travelling along the transfer deck 130B) may include drive wheel 261W velocity and position of the autonomous transport vehicle on the transfer deck 130B. These dynamic performance variables may be transmitted by the controller 1220 to the control server 120 for registry in one or more transfer deck data log(s) 1300 stored in any suitable memory of the control server 120 (see the various memories 102-104 illustrated in FIG. 1A with respect to the representative controller REPCON). The dynamic performance variables of one or multiple autonomous transport vehicle are communicated from the controller 1220 (e.g., via the network 180) to the control server 120. The control server 120 is configured with any suitable data analysis algorithms (e.g., image processing algorithms, numerical analysis algorithms, artificial neural networks, etc.) that are configured to compare the dynamic performance variables of the one or more autonomous transport vehicles 110 for anomalous data such as the rapid increase and decrease (i.e., spike) in wheel velocity that is indicative of wheel 261W slippage on the traverse surface VRS of the transport deck 130B at a position on the transfer deck 130B provided by the dynamic performance variables. Where the control server 120 determines a repeated (e.g., trending) occurrence of wheel slip at substantially the same position on the transfer deck 130B, the control server may communicate (through the network 180) a maintenance message to a user (via the user interface UI) of the automated storage and retrieval system 110 that a presence of a possible contaminant (e.g., leaked, spilled, etc. from transferred payload) is located at the predetermined location of the transfer deck 130B.

As another example, autonomous transport vehicle 110 drive motor 261M torque may be output with respect to a position of the autonomous transport vehicle 110 on the transfer deck 110B (or picking aisle 110A). Repeated (e.g., trending) spikes in the motor torque at substantially the same position on the transfer deck 130B may be indicative of an anomaly on the transfer deck (worn or damaged travel surface or guide) that is hindering (stopping or slowing) travelling of the autonomous transport vehicle 110 along the transfer deck 130B. Where the control server 120 determines a repeated (e.g., trending) occurrence of increased torque at substantially the same position on the transfer deck 130B, the control server may communicate (through the network 180) a maintenance message to a user (via the user interface UI) of the automated storage and retrieval system 110 that the transfer deck 130B is in need of maintenance at the predetermined location of the transfer deck 130B. As may be realized, a similar trending analysis may be effected by the control server 120 for autonomous transport vehicle 110 picking/placing of payload to storage spaces 130S or other case CU holding areas, where increased motor torque in the transfer arm extension motor(s) 275 repeatedly exists at substantially a same location of the automated storage and retrieval system 100 (such as at the substantially same location in a picking aisle) may be indicative of a bent shelf support surface or other anomaly of the case support surface that may need maintenance (e.g., the fingers 210AF of the transfer arm 210A may be interacting/rubbing against the bent support surface, thereby causing an increase in motor 275 torque).

Referring to FIGS. 1, 1A, 2A-2C, 7, 8, and 14, an exemplary method for health assessment of a component of the automated storage and retrieval system 100. For exemplary purposes the component of the automated storage and retrieval system 100 will be described as the autonomous transport vehicle; however, it should be understood that the method is applicable to any component of the automated storage and retrieval system for which a conservative motion component can be determined. The method includes providing the autonomous transport vehicle 110 (FIG. 14, Block 1400) having the features described herein. The controller 1220 (or control server 120 or warehouse management system 2500), operably connected to the drive section 110DS, registers predetermined operating data (FIG. 14, Block 1410) embodying at least one dynamic performance variable output by the drive section 110DS effecting a predetermined motion in at least one direction (e.g., such as transfer arm extension in a predetermined direction LAT1, LAT2, payload bed 210B movement in direction VER1, VER2, etc.), that defines a predetermined common motion manifold 888, 7000, of the transfer arm 210A (also referred to as a payload transport) in the at least one direction. The controller 1220 (or control server 120 or warehouse management system 2500) resolves from the predetermined common motion manifold 888, 7000 a conservative motion component 889, 7010 of the predetermined motion (FIG. 14, Block 1420), where the conservative motion component 889, 7010 is substantially common across each motion within the predetermined common motion manifold 888, 7000.

In accordance with one or more aspects of the disclosed embodiment, an autonomous transport vehicle for transporting a payload is provided. The autonomous transport vehicle includes: a frame forming a transport payload area of the autonomous transport vehicle, the payload area includes a payload contact support surface that defines a payload support plane of the autonomous transport vehicle that supports the payload held in the transport payload area with vehicle traverse; a payload handling system connected to the frame, the payload handling system having: a payload transport disposed to engage the payload and transport the payload in at least one direction relative to the frame, and a drive section with at least one degree of freedom driving the payload transport in the at least one direction; and a controller operably connected to the drive section configured to register predetermined operating data embodying at least one dynamic performance variable output by the drive section effecting a predetermined motion, that defines a predetermined common motion manifold, of the payload transport in the at least one direction; wherein the controller has a resolver arranged to resolve from the predetermined common motion manifold a conservative motion component of the predetermined motion, the conservative motion component being substantially common across each motion within the predetermined common motion manifold.

In accordance with one or more aspects of the disclosed embodiment, each motion of the predetermined common motion manifold includes the conservative motion component, and the conservative motion component is substantially coincident for each motion of the predetermined common motion manifold.

In accordance with one or more aspects of the disclosed embodiment, the conservative motion component characterizes a payload independent component of each motion of the predetermined common motion manifold.

In accordance with one or more aspects of the disclosed embodiment, the controller is configured to resolve a respective conservative motion of the payload transport in each different corresponding predetermined common motion manifold that corresponds to a different payload transport motion in each different direction of the at least one direction, determined by each different degree of freedom of the at least one degree of freedom of the drive section.

In accordance with one or more aspects of the disclosed embodiment, the controller is configured to determine from the registered predetermined operating data a base predetermined characteristic characterizing, each of the at least one dynamic performance variable, of the conservative motion of the payload transport in a base condition.

In accordance with one or more aspects of the disclosed embodiment, the controller is configured to determine from the registered predetermined operating data an operating predetermined characteristic characterizing, each of the at least one dynamic performance variable output, of the conservative motion component of the payload transport in an operating condition.

In accordance with one or more aspects of the disclosed embodiment, the controller is configured to compare the base predetermined characteristic and the operating predetermined characteristic for each of the at least one dynamic performance variable output assessing the health of the payload transport based on the comparison.

In accordance with one or more aspects of the disclosed embodiment, each conservative motion component is based on one or more of: a torque command in the at least one degree of freedom of the drive section, and a position command in the at least one direction of payload transport motion; and the at least one dynamic performance variable output resultant from the one or more of the torque command and the position command, is decoupled from the payload or a presence of the payload engaged by the payload transport in motion.

In accordance with one or more aspects of the disclosed embodiment, the controller has a registry disposed to register a histogram of the predetermined motion, and the defined predetermined common motion manifold, effected by the payload transport, and the controller resolves the conservative motion component from repeated access of the histogram.

In accordance with one or more aspects of the disclosed embodiment, the controller is communicably coupled to at least one payload transport motion sensor that senses the predetermined operating data.

In accordance with one or more aspects of the disclosed embodiment, a method for health assessment of an autonomous transport vehicle is provided. The method includes: providing the autonomous transport vehicle having: a frame forming a transport payload area of the autonomous transport vehicle, the payload area includes a payload contact support surface that defines a payload support plane of the autonomous transport vehicle that supports a payload held in the transport payload area with vehicle traverse, and a payload handling system connected to the frame, the payload handling system having: a payload transport disposed to engage the payload and transport the payload in at least one direction relative to the frame, and a drive section with at least one degree of freedom driving the payload transport in the at least one direction; registering, with a controller operably connected to the drive section, predetermined operating data embodying at least one dynamic performance variable output by the drive section effecting a predetermined motion, that defines a predetermined common motion manifold, of the payload transport in the at least one direction; and with a resolver of the controller, resolving from the predetermined common motion manifold a conservative motion component of the predetermined motion, the conservative motion component being substantially common across each motion within the predetermined common motion manifold.

In accordance with one or more aspects of the disclosed embodiment, each motion of the predetermined common motion manifold includes the conservative motion component, and the conservative motion component is substantially coincident for each motion of the predetermined common motion manifold.

In accordance with one or more aspects of the disclosed embodiment, the conservative motion component characterizes a payload independent component of each motion of the predetermined common motion manifold.

In accordance with one or more aspects of the disclosed embodiment, the method further includes resolving, with the controller, a respective conservative motion of the payload transport in each different corresponding predetermined common motion manifold that corresponds to a different payload transport motion in each different direction of the at least one direction, determined by each different degree of freedom of the at least one degree of freedom of the drive section.

In accordance with one or more aspects of the disclosed embodiment, the method further includes, with the controller, determining from the registered predetermined operating data a base predetermined characteristic characterizing, each of the at least one dynamic performance variable, of the conservative motion of the transport in a base condition.

In accordance with one or more aspects of the disclosed embodiment, the method further includes, with the controller, determining from the registered predetermined operating data an operating predetermined characteristic characterizing, each of the at least one dynamic performance variable output, of the conservative motion component of the payload transport in an operating condition.

In accordance with one or more aspects of the disclosed embodiment, the method further includes: comparing, with the controller, the base predetermined characteristic and the operating predetermined characteristic for each of the at least one dynamic performance variable output; and assessing, with the controller, the health of the payload transport based on the comparison.

In accordance with one or more aspects of the disclosed embodiment, each conservative motion component is based on one or more of: a torque command in the at least one degree of freedom of the drive section, and a position command in the at least one direction of payload transport motion; and the at least one dynamic performance variable output resultant from the one or more of the torque command and the position command, is decoupled from the payload or a presence of the payload engaged by the payload transport in motion.

In accordance with one or more aspects of the disclosed embodiment, the method further includes registering, in a registry of the controller, a histogram of the predetermined motion, and the defined predetermined common motion manifold, effected by the payload transport, wherein the controller resolves the conservative motion component from repeated access of the histogram.

In accordance with one or more aspects of the disclosed embodiment, the method further includes sensing the predetermined operating data with at least one transport motion sensor communicably coupled to the controller.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. An autonomous transport vehicle for transporting a payload comprising:
    a frame forming a transport payload area of the autonomous transport vehicle, the payload area includes a payload contact support surface that defines a payload support plane of the autonomous transport vehicle that supports the payload held in the transport payload area with vehicle traverse;
    a payload handling system connected to the frame, the payload handling system having:
    a payload transport disposed to engage the payload and transport the payload in at least one direction relative to the frame, and
    a drive section with at least one degree of freedom driving the payload transport in the at least one direction; and
    a controller operably connected to the drive section configured to register predetermined operating data embodying at least one dynamic performance variable output by the drive section effecting a predetermined motion, that defines a predetermined common motion manifold, of the payload transport in the at least one direction;
    wherein the controller has a resolver arranged to resolve from the predetermined common motion manifold a conservative motion component of the predetermined motion, the conservative motion component being substantially common across each motion within the predetermined common motion manifold.

2. The autonomous transport vehicle of claim 1, wherein each motion of the predetermined common motion manifold includes the conservative motion component, and the conservative motion component is substantially coincident for each motion of the predetermined common motion manifold.

3. The autonomous transport vehicle of claim 1, wherein the conservative motion component characterizes a payload independent component of each motion of the predetermined common motion manifold.

4. The autonomous transport vehicle of claim 1, wherein the controller is configured to resolve a respective conservative motion of the payload transport in each different corresponding predetermined common motion manifold that corresponds to a different payload transport motion in each different direction of the at least one direction, determined by each different degree of freedom of the at least one degree of freedom of the drive section.

5. The autonomous transport vehicle of claim 4, wherein the controller is configured to determine from the registered predetermined operating data a base predetermined characteristic characterizing, each of the at least one dynamic performance variable, of the conservative motion of the payload transport in a base condition.

6. The autonomous transport vehicle of claim 5, wherein the controller is configured to determine from the registered predetermined operating data an operating predetermined characteristic characterizing, each of the at least one dynamic performance variable output, of the conservative motion component of the payload transport in an operating condition.

7. The autonomous transport vehicle of claim 6, wherein the controller is configured to compare the base predetermined characteristic and the operating predetermined characteristic for each of the at least one dynamic performance variable output assessing the health of the payload transport based on the comparison.

8. The autonomous transport vehicle of claim 1, wherein each conservative motion component is based on one or more of:
    a torque command in the at least one degree of freedom of the drive section, and
    a position command in the at least one direction of payload transport motion; and
    the at least one dynamic performance variable output resultant from the one or more of the torque command and the position command, is decoupled from the payload or a presence of the payload engaged by the payload transport in motion.

9. The autonomous transport vehicle of claim 1, wherein the controller has a registry disposed to register a histogram of the predetermined motion, and the defined predetermined common motion manifold, effected by the payload transport, and the controller resolves the conservative motion component from repeated access of the histogram.

10. The autonomous transport vehicle of claim 1, wherein the controller is communicably coupled to at least one payload transport motion sensor that senses the predetermined operating data.

11. A method for health assessment of an autonomous transport vehicle, the method comprising:
    providing the autonomous transport vehicle having:
    a frame forming a transport payload area of the autonomous transport vehicle, the payload area includes a payload contact support surface that defines a payload support plane of the autonomous transport vehicle that supports a payload held in the transport payload area with vehicle traverse, and
    a payload handling system connected to the frame, the payload handling system having:
    a payload transport disposed to engage the payload and transport the payload in at least one direction relative to the frame, and
    a drive section with at least one degree of freedom driving the payload transport in the at least one direction;
    registering, with a controller operably connected to the drive section, predetermined operating data embodying at least one dynamic performance variable output by the drive section effecting a predetermined motion, that defines a predetermined common motion manifold, of the payload transport in the at least one direction; and with a resolver of the controller, resolving from the predetermined common motion manifold a conservative motion component of the predetermined motion, the conservative motion component being substantially common across each motion within the predetermined common motion manifold.

12. The method of claim 11, wherein each motion of the predetermined common motion manifold includes the conservative motion component, and the conservative motion component is substantially coincident for each motion of the predetermined common motion manifold.

13. The method of claim 11, wherein the conservative motion component characterizes a payload independent component of each motion of the predetermined common motion manifold.

14. The method of claim 11, further comprising resolving, with the controller, a respective conservative motion of the payload transport in each different corresponding predetermined common motion manifold that corresponds to a different payload transport motion in each different direction of the at least one direction, determined by each different degree of freedom of the at least one degree of freedom of the drive section.

15. The method of claim 11, further comprising, with the controller, determining from the registered predetermined operating data a base predetermined characteristic characterizing, each of the at least one dynamic performance variable, of the conservative motion of the transport in a base condition.

16. The method of claim 15, further comprising, with the controller, determining from the registered predetermined operating data an operating predetermined characteristic characterizing, each of the at least one dynamic performance variable output, of the conservative motion component of the payload transport in an operating condition.

17. The method of claim 16, further comprising:

comparing, with the controller, the base predetermined characteristic and the operating predetermined characteristic for each of the at least one dynamic performance variable output; and assessing, with the controller, the health of the payload transport based on the comparison.

18. The method of claim 11, wherein each conservative motion component is based on one or more of:

a torque command in the at least one degree of freedom of the drive section, and a position command in the at least one direction of payload transport motion; and the at least one dynamic performance variable output resultant from the one or more of the torque command and the position command, is decoupled from the payload or a presence of the payload engaged by the payload transport in motion.

19. The method of claim 11, further comprising registering, in a registry of the controller, a histogram of the predetermined motion, and the defined predetermined common motion manifold, effected by the payload transport, wherein the controller resolves the conservative motion component from repeated access of the histogram.

20. The method of claim 11, further comprising sensing the predetermined operating data with at least one transport motion sensor communicably coupled to the controller.

* * * * *